US012381378B2

(12) United States Patent
Quaglia et al.

(10) Patent No.: US 12,381,378 B2
(45) Date of Patent: Aug. 5, 2025

(54) OVERHEAD RACK SUPPORT

(71) Applicant: Legrand DPC LLC, West Hartford, CT (US)

(72) Inventors: Michael D. Quaglia, Waterford, CT (US); Michael O'Sullivan, Bay Shore, NY (US); Paul Mallia, East Setauket, NY (US)

(73) Assignee: Legrand DPC, LLC, West Hartford, CT (US)

( * ) Notice: Subject to any disclaimer, the term of this patent is extended or adjusted under 35 U.S.C. 154(b) by 338 days.

(21) Appl. No.: 18/118,173

(22) Filed: Mar. 7, 2023

(65) Prior Publication Data
US 2024/0305076 A1   Sep. 12, 2024

(51) Int. Cl.
*H02G 3/04* (2006.01)
(52) U.S. Cl.
CPC ................. *H02G 3/0456* (2013.01)
(58) Field of Classification Search
CPC ................................... H02G 3/0456
USPC ......................................... 361/826
See application file for complete search history.

(56) References Cited

U.S. PATENT DOCUMENTS

| 8,014,171 | B2* | 9/2011 | Kelly ..................... H04Q 1/068 361/825 |
| 10,271,449 | B1* | 4/2019 | Yousif .................... A47B 57/44 |
| 2008/0151524 | A1* | 6/2008 | Kelly ..................... H04Q 1/064 361/826 |
| 2017/0155236 | A1* | 6/2017 | Munro ................. F16M 13/027 |
| 2019/0246513 | A1* | 8/2019 | Chen ....................... A47B 81/00 |
| 2020/0039010 | A1* | 2/2020 | Gosselin ............ H05K 7/20736 |

OTHER PUBLICATIONS

"Legrand Network Infrastructure Solutions Catalog: Copper, Fiber & Physical Support", pp. 1-3, pp. 163-165, 2022.

* cited by examiner

*Primary Examiner* — Timothy J Thompson
*Assistant Examiner* — Michael F McAllister
(74) *Attorney, Agent, or Firm* — McCarter & English, LLP

(57) ABSTRACT

An example overhead rack support is provided. The overhead rack support includes a first support assembly and a second support assembly, each of which includes a base component, first and second vertical components coupled to the base component, and at least one horizontal component extending through an opening in the first and second vertical components and coupled to the first and second vertical components. The overhead rack support includes a first brace member coupled to the first vertical components, and a second brace member coupled to the second vertical components.

20 Claims, 27 Drawing Sheets

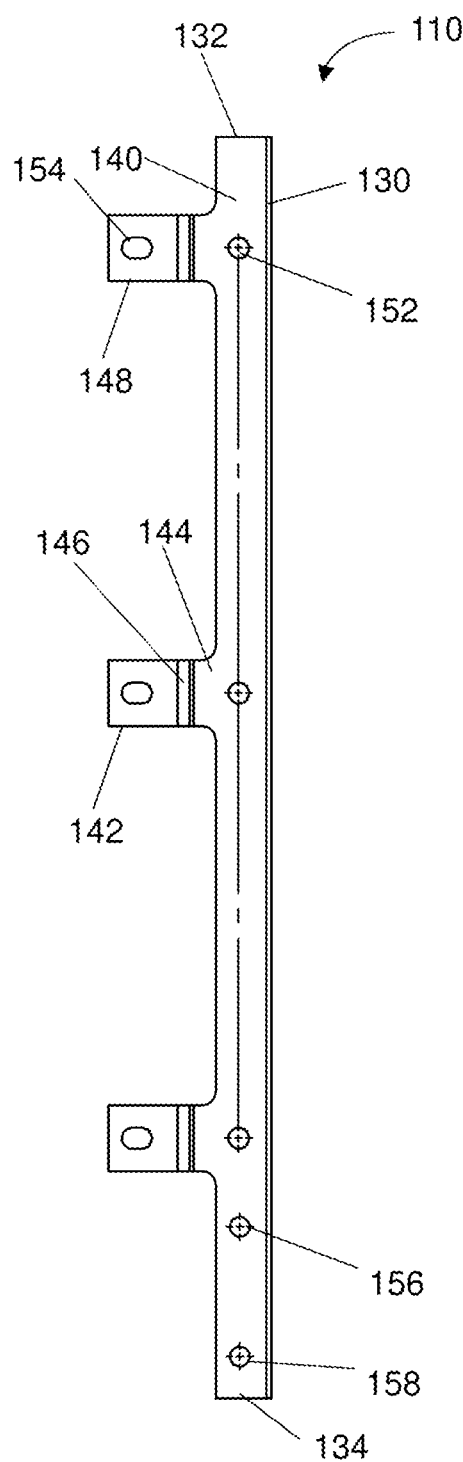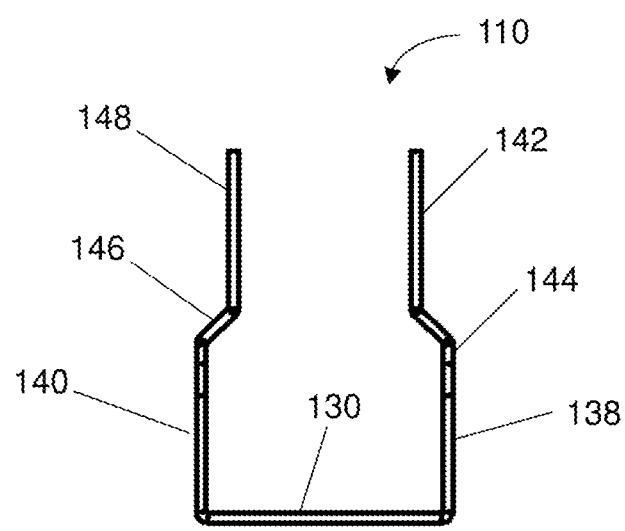
FIG. 16
FIG. 15

OVERHEAD RACK SUPPORT

BACKGROUND

Media patching systems are used in the telecommunications industry for interconnectivity of a variety of connectors. As the density of media patching systems and the racks associated with such system increase, the number of cables passing into and out of the media patching systems also increases. In some instances, management of cables passing in and out of racks is handled by supports mounted to the ceiling of the room. However, such mounting of support structures may not be feasible in older buildings or due to other structures mounted to/extending from the ceiling, and may have limits as to the weight supported by the ceiling.

SUMMARY

Embodiments of the present disclosure provide overhead rack supports mountable directly to the top of the racks or cabinets. Such overhead rack supports provide for convenient support of cables extending from and into the racks/cabinets, and allow for more direct routing of cables requiring support. The overhead rack supports can be installed in a more cost effective manner, as compared to floor mounted or ceiling mounted cable management options. The mounting of the overhead rack supports on the racks/cabinets ensures that movement for users around the racks/cabinets is unobstructed in order to maintain access to the interior of the racks/cabinets. The overhead rack supports can be customized to include multiple levels for cable support, and can potentially extend up to the ceiling of the data center without relying on support from the ceiling itself. In some embodiments, the overhead rack supports can be mounted in a manner that ensures Category D seismic support for cables in the data center.

In accordance with embodiments of the present disclosure, an exemplary overhead rack support is provided. The overhead rack support includes a first support assembly and a second support assembly. Each of the first and second support assemblies include a base component defining a bottom surface of the first and second support assemblies. The base component includes opposing first and second ends. Each of the first and second support assemblies include a first vertical component coupled to the first end of the base component, and a second vertical component coupled to the second end of the base component. Each of the first and second vertical components includes at least one opening formed therein. Each of the first and second support assemblies include at least one horizontal component extending through the at least one opening of the first and second vertical components and coupled to the first and second vertical components. The overhead rack support includes a first brace member coupled to the first vertical component of the first and second support assemblies, and a second brace member coupled to the second vertical components of the first and second support assemblies.

The first and second support assemblies can be oriented parallel (or substantially parallel) to each other and are spaced from each other. The support can include a third support assembly also including the base component, the first vertical component, the second vertical component, and the at least one horizontal component. In such embodiments, the first brace member can be coupled to the first vertical component of the first support assembly near a top edge of the first vertical component of the first support assembly, the first brace member can be coupled to the first vertical component of the second support assembly near a center of the first vertical component of the second support assembly, and the first brace member can be coupled to the first vertical component of the third support assembly near a bottom edge of the first vertical component of the third support assembly. In some embodiments, the first and second braces can be oriented in opposing directions relative to each other.

The base component can include a central wall, and flanges extending perpendicularly on opposing sides of the central wall. The base component can include extensions protruding from the flanges at each corner of the base component. The flanges ca be aligned with the flanges and extend perpendicularly relative to the central wall. The base component can define a U-shaped configuration from both a front view and a side view.

The first vertical component can be structurally equivalent to the second vertical component. Each of the first and second vertical components can include a central wall with the at least one opening formed therein, and flanges extending perpendicularly from opposing sides of the central wall. The first and second vertical components can include mounting brackets extending from each of the flanges and aligned with the at least one opening. The mounting bracket includes a first section extending in-line with the flanges, a second section extending from the first section and tapering inwardly over the central wall, and a third section extending from the second section parallel to the first section and laterally offset relative to the first section. The second section tapers inwardly to define a width between the third section of the mounting brackets complementary to a width of the at least one horizontal component. A bottom edge of the at least one opening of the first and second vertical components abuts a bottom wall of the at least one horizontal component to physically support the at least one horizontal component.

The at least one horizontal component includes a section extending from the first vertical component to the second vertical component, and includes at least one cantilevered section extending beyond a plane defined by at least one of the first vertical component or the second vertical component. The at least one horizontal component includes openings formed in the at least one cantilevered section. The support can include a removable cable support coupled to the at least one horizontal component at the openings formed in the at least one cantilevered section.

In accordance with embodiments of the present disclosure, an exemplary cabinet system is provided. The system includes at least one cabinet and an overhead rack support mounted to a top surface of the at least one cabinet. The overhead rack support includes a first support assembly and a second support assembly. Each of the first and second support assemblies include a base component defining a bottom surface of the first and second support assemblies. The base component includes opposing first and second ends. Each of the first and second support assemblies include a first vertical component coupled to the first end of the base component, and a second vertical component coupled to the second end of the base component. Each of the first and second vertical components includes at least one opening formed therein. Each of the first and second support assemblies include at least one horizontal component extending through the at least one opening of the first and second vertical components and coupled to the first and second vertical components. The support includes a first brace member coupled to the first vertical component of the first and second support assemblies, and a second brace member coupled to the second vertical components of the first and second support assemblies. The system can include a cable support mounted to the at least one horizontal component of the overhead rack support. The system can include a support system mounted to and extending from a floor, the support system extending over the cable support to engage with the cable support and maintain a position of the cable support.

In accordance with embodiments of the present disclosure, an exemplary method of cable support is provided. The method includes mounting an overhead rack support to a top surface of a cabinet. The overhead rack support includes a first support assembly and a second support assembly. Each of the first and second support assemblies include a base component defining a bottom surface of the first and second support assemblies. The base component includes opposing first and second ends. Each of the first and second support assemblies include a first vertical component coupled to the first end of the base component, and a second vertical component coupled to the second end of the base component. Each of the first and second vertical components includes at least one opening formed therein. Each of the first and second support assemblies include at least one horizontal component extending through the at least one opening of the first and second vertical components and coupled to the first and second vertical components. The support includes a first brace member coupled to the first vertical component of the first and second support assemblies, and a second brace member coupled to the second vertical components of the first and second support assemblies. The method includes routing cables from the cabinet to the at least one horizontal component to support the cables with the at least one horizontal component.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the overhead rack support, reference is made to the accompanying figures, wherein:

FIG. 15 is a side view of a vertical component of FIG. 13;

FIG. 16 is a top view of a vertical component of FIG. 13;

DETAILED DESCRIPTION

Figure 1:
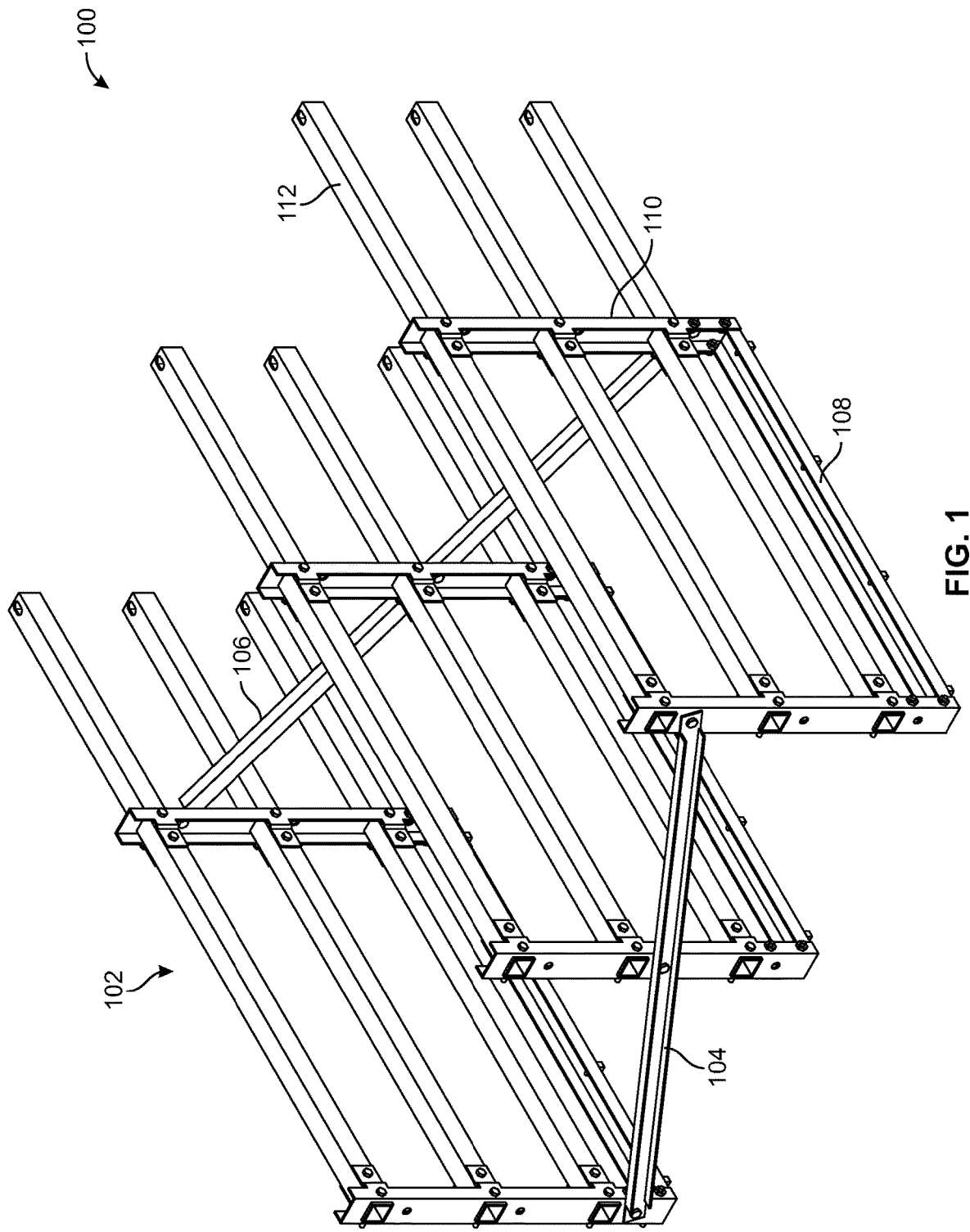
FIG. 1 is a perspective view of an exemplary overhead rack support in accordance with embodiments of the present disclosure, including a single side of cantilever extensions.
Figure 2:
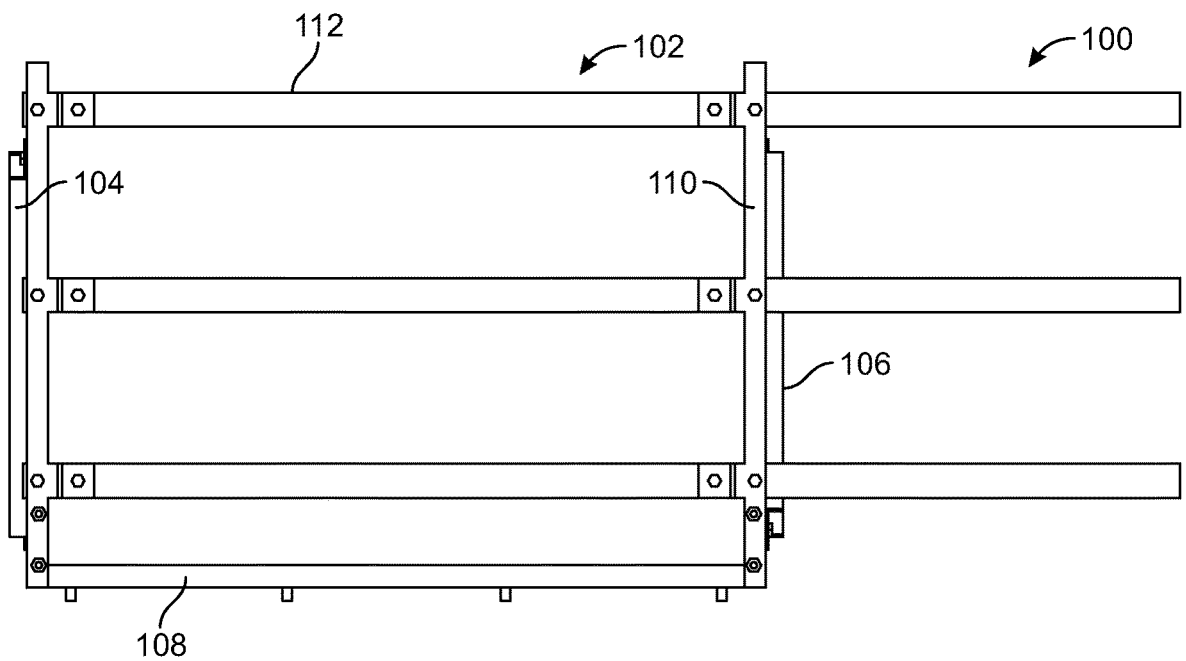
FIG. 2 is a left side view of an exemplary overhead rack support of FIG. 1.

FIGS. 1-6 are perspective, left, rear, top, bottom and front views of an exemplary overhead rack support 100 (hereinafter "support 100"). The support 100 is formed by an assembly of two or more vertical support assemblies 102, which can be fixedly coupled to each other with braces 104, 106 on opposing sides of the vertical support assemblies 102. For example, the support 100 of FIGS. 1-6 includes three vertical support assemblies 102, and the braces 104, 106 are coupled in opposing diagonal configurations on opposing sides of the support 100. The opposing diagonal configuration at the front and rear of the support 100 creates opposing coupling forces on the vertical support assemblies 102 to ensure the entire assembly for the support 100 is maintain as illustrated in FIGS. 1-6. The vertical support assemblies 102 are aligned in a parallel and spaced manner relative to each other in forming the support 100. The material and/or gauge/diameter used for the components, e.g., sheet metal or metal tubing, can be selected based on the required weight support and/or seismic support requirements.

FIGS. 7-12 are perspective, side and cross-sectional/detailed views of the vertical support assembly 102. Each vertical support assembly 102 includes a base component 108 (e.g., a base bracket or brace, or the like) defining the bottom surface of the assembly 102. Each vertical support assembly 102 includes a vertical component 110 (e.g., a vertical bracket or brace, or the like) coupled to the base component 108 at opposing front and rear edges/sides. The vertical component 110 on both sides of the base component 108 are identical and allow for an easier assembly process by ensuring compatibility of the components. The vertical components 110 are coupled to the base component 108 in a perpendicular orientation. Each vertical support assembly 102 includes one or more horizontal components 112 (e.g., horizontal tubing, cantilever tubing, or the like) passing at least partially through and coupled to the vertical components 110. The horizontal components 112 extend substantially perpendicularly to the vertical components 110 and substantially parallel to the base component 108. Each component of the support 100 will be discussed in detail prior to discussion of the assembly of the components for forming the support 100. The cross-section of the vertical components 110 provides rigidity to the support 100 in the vertical direction, and braces 104, 106 provide resistance to lateral loading. These features allow the support 100 to meet seismic support requirements.

With reference to FIGS. 19-22, perspective, side, top and front views of the base component 108 of the support 100 are provided. The base component 108 generally includes an elongated, flat/planar bottom surface 114 (e.g., a central surface or wall) with side walls or flanges 116, 118 extending perpendicularly from opposing side edges of the bottom surface 114. The flanges 116, 118 extend the entire length of the bottom surface 114 between opposing ends of the bottom surface 114. Each flange 116, 118 includes an extension 120 protruding from the respective flange 116, 118 and aligned with a plane defined by the respective flange 116, 118. The flanges 116, 118 and extensions 120 are planar/flat and perpendicularly oriented relative to the bottom surface 114. The extensions 120 can be located at each end of the flanges 116, 118 and are aligned with the edges of the bottom surface 114. Each extension 120 protrudes beyond the top edge of the flanges 116, 118, and is thereby dimensioned greater in height than the flanges 116, 118. From the side view of FIG. 20, the base component 108 defines a U-shaped configuration. Similarly, from the front view of FIG. 22, the base component 108 also defines a U-shaped configuration with a hollow passage between the flanges 116, 118 and extensions 120.

The bottom surface 114 can include four pairs of openings 122, 124 formed therein. One pair of openings 122, 124 can be formed offset from an edge of the bottom surface 114, a second pair of openings 122, 124 can be formed offset from an opposing edge of the bottom surface 114, and the third and fourth pairs of openings 122, 124 can be equally spaced in-between the first and second pair of openings 122, 124 (see, e.g., FIG. 21). Each extension 118 includes openings 126, 128 formed therein and aligned with the corresponding openings 126, 128 formed in the adjacent extension 118. The openings 126, 128 can be formed at or near the top and bottom edges of the extension 118.

With reference to FIGS. 13-16, perspective, front, side and top views of the vertical component 110 of the support 100 are provided. The vertical component 110 includes a planar/flat central surface 130 (e.g., central wall) extending the length of the vertical component 110 between flat opposing edges 132, 134. The central surface 130 includes openings 136 formed therein. The openings 136 can be dimensioned to at least partially receive the horizontal components 112 therethrough. As such, the dimensions and configuration of the openings 136 is complementary to the dimensions and configuration of the horizontal components 112. In the assembly discussed herein, because the horizontal components 112 are formed from square tubing, the openings 136 similarly define a square configuration. However, it should be understood that other tubing configurations and corresponding openings could be used. One opening 136 can be formed at or near the top edge 132, a second opening 136 can be formed offset further from the bottom edge 132 (as compared to the offset distance of the opening 136 near the top edge 132), and a third opening 136 can be formed an equal distance between the top and bottom openings 136. The central surface 130 includes circular openings 150 formed below and offset from the openings 136.

The vertical component 110 includes flanges 138, 140 extending perpendicularly from opposing edges of the central surface 130 along the entire length of the central surface 130 from edge 132 to edge 134. The flanges 138, 140 define a flat/planar surface. Each flange 138, 140 includes a mounting bracket 142 extending from the respective flange 138, 140 on opposing sides of and substantially aligned with the location of the openings 136. As discussed below, the mounting brackets 142 are usable to engage and couple with the horizontal component 112. Each mounting bracket 142 includes a first section 144 extending from the edge of the respective flange 138, 140 and aligned along the plane defined by the flange 138, 140.

Each mounting bracket 142 includes an inwardly directed angled section 146 that extends over and away from the central surface 130. The angled section 146 connects at one edge to the edge of the first section 144. As illustrated in FIG. 16, the angled sections 146 of the opposing mounting brackets 142 extend towards each other. Each mounting bracket 142 includes a third section extending from an opposing edge of the angled section 146 in a perpendicular orientation relative to the central surface 130 and in a parallel (yet offset) orientation relative to the flanges 138, 140 and the first section 144. The pairs of mounting brackets 142 therefore create a narrower space in-between as compared to the distance between the flanges 138, 140. The narrower space allows for a tighter or aligned positioning of the inner surface of the brackets 142 to the exterior surface of the horizontal component 112 during assembly. Each flange 138, 140 includes an opening 152 formed therein and substantially aligned with the position of the mounting brackets 142. The mounting brackets 142 each include openings 154 formed in the third section 148. Each flange 138, 140 can include additional openings 156, 158 formed between the lowermost opening 152 and the edge 134.

Figure 17:
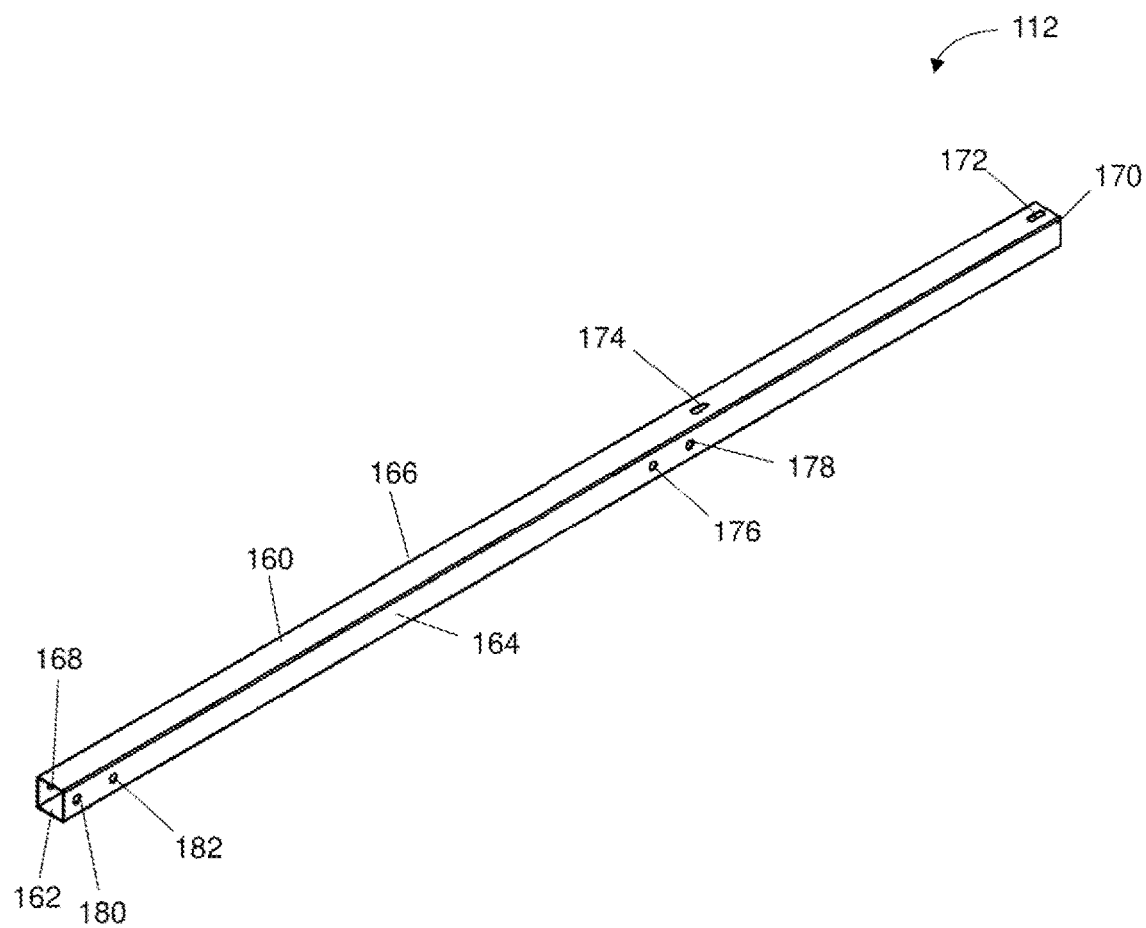
FIG. 17 is a perspective view of a horizontal or cantilever component of a vertical support assembly of FIG. 7.
Figure 18:
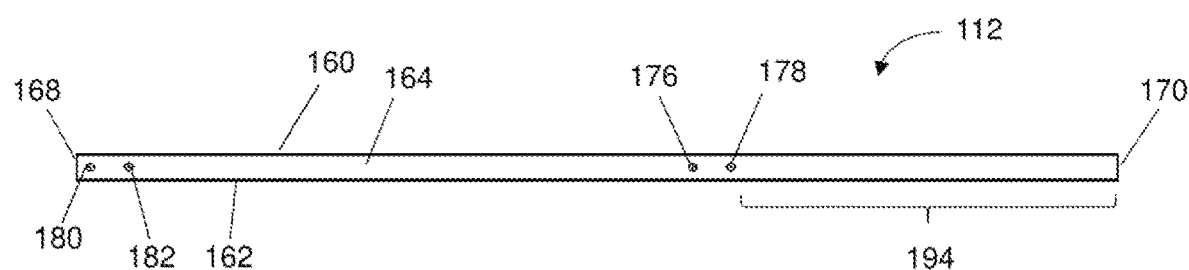
FIG. 18 is a side view of a horizontal or cantilever component of FIG. 17.
Figure 19:
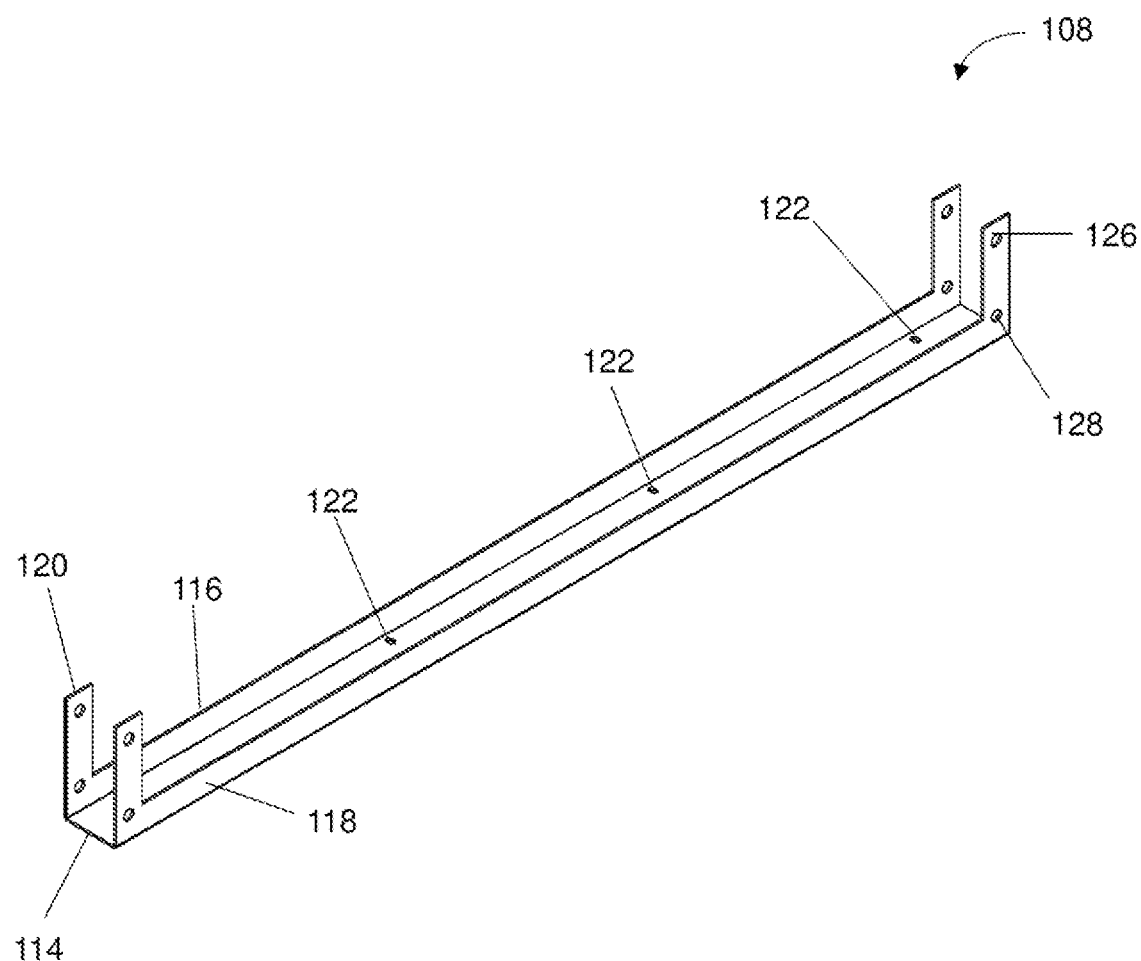
FIG. 19 is a perspective view of a base component of a vertical support assembly of FIG. 7.
Figure 20:
FIG. 20 is a side view of a base component of FIG. 19.
Figures 21, 22:
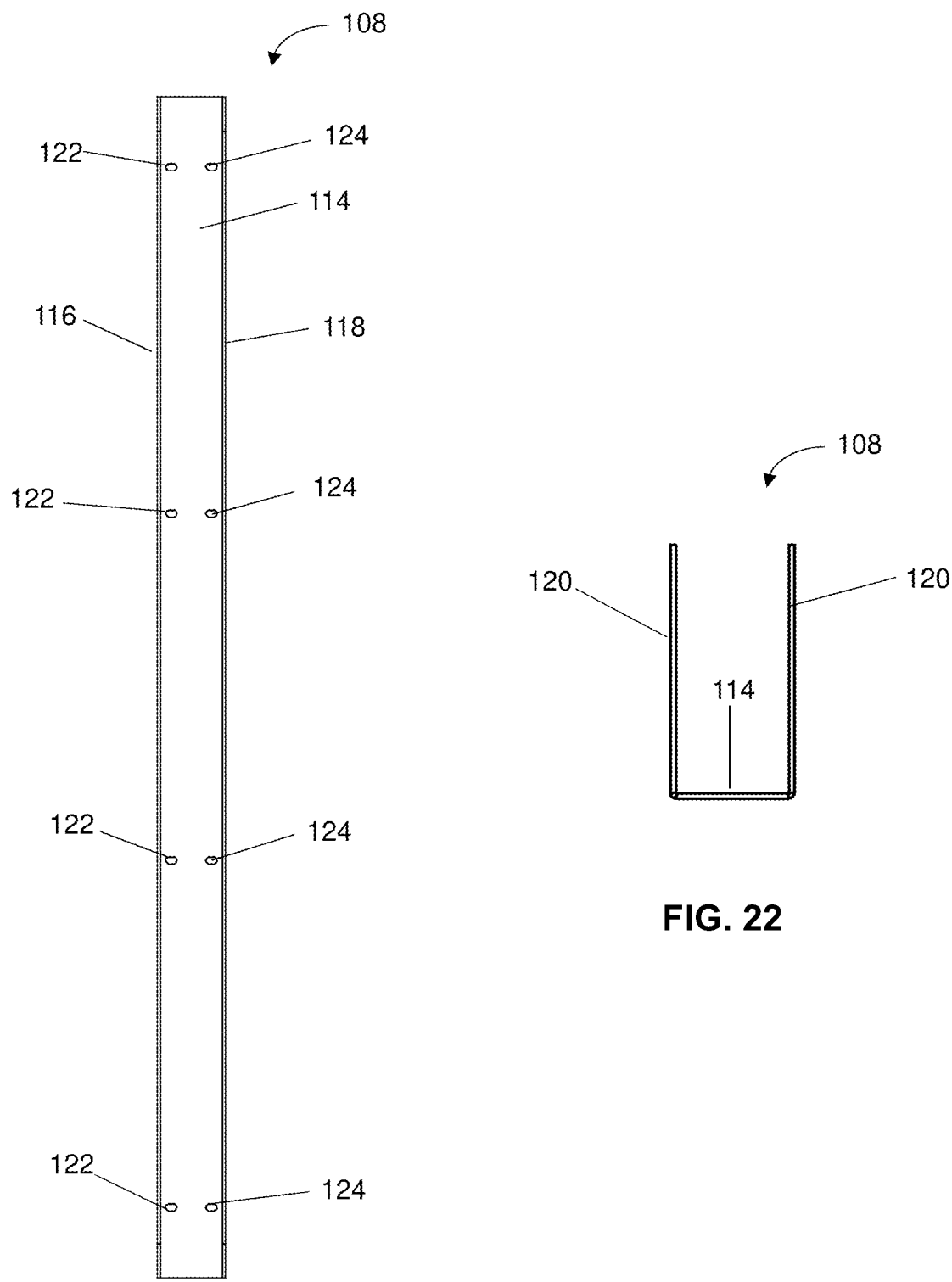
FIG. 21 is a top view of a base component of FIG. 19.
FIG. 22 is a front view of a base component of FIG. 19.

With reference to FIGS. 17-18, perspective and side views of the horizontal component 112 are provided. In some embodiments, the horizontal component 112 can be configured as a square tubing having a hollow interior and opposing walls 160, 162, 164, 166 (e.g., top, bottom and side walls). In some embodiments, the walls 160-166 can be dimensions as having equal widths and lengths. The length can be defined as the distance between opposing ends 168, 170. In some embodiments, the dimensions of the walls 160-166 can be different, e.g., same top and bottom walls 160, 162 differently dimensioned from equally sized side walls 164, 166. In some embodiments, the horizontal component 112 can be in the form of a circular tubing. The top wall 160 includes a slot 172 formed at or near the edge 170, and a slot 174 formed spaced from the edge 170. The side walls 164, 166 can include one pair of openings 176, 178 located at a position between the edges 168, 170, and a second pair of openings 180, 182 near or just offset from the edge 168.

Figure 12:
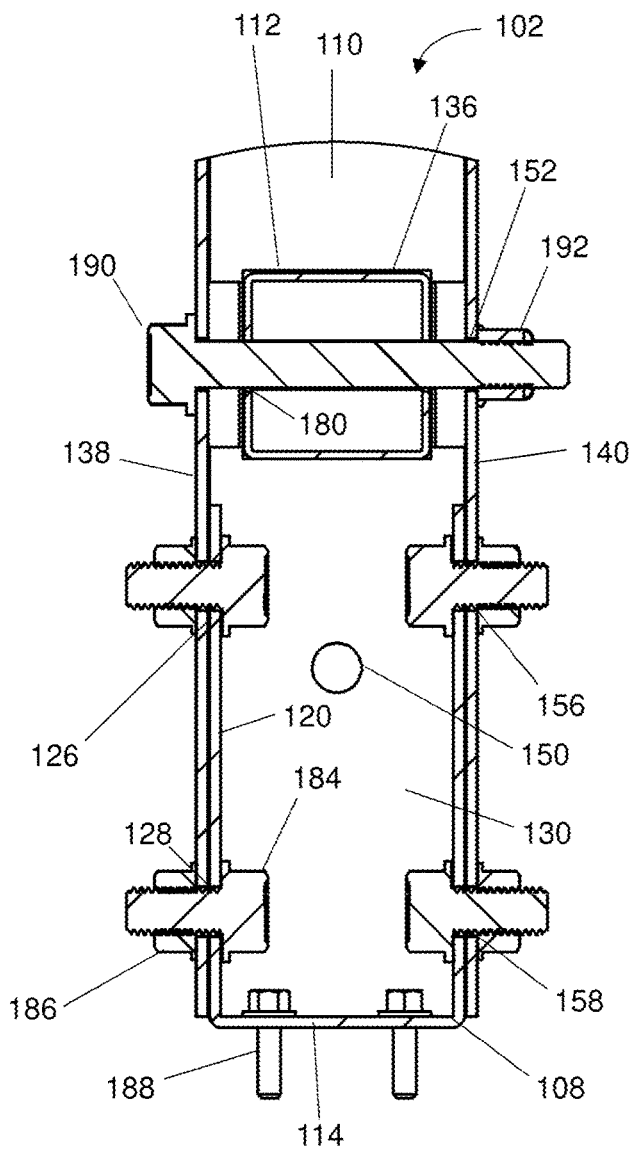
FIG. 12 is a cross-sectional, detailed view of a vertical support assembly of FIG. 11.
Figure 13:
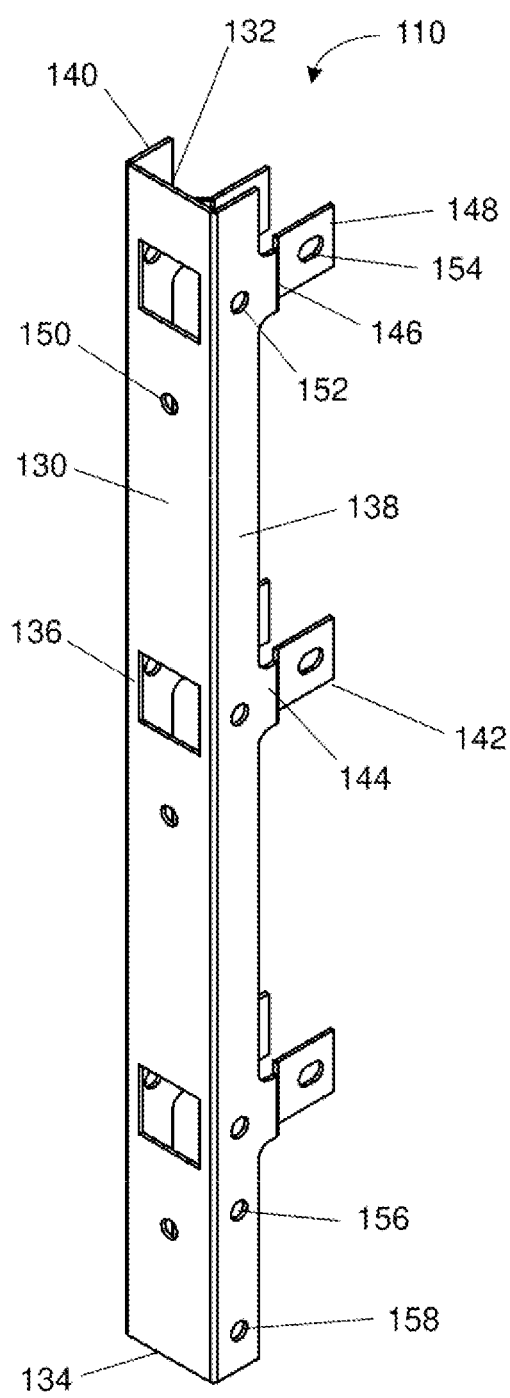
FIG. 13 is a perspective view of a vertical component of a vertical support assembly of FIG. 7.
Figure 14:
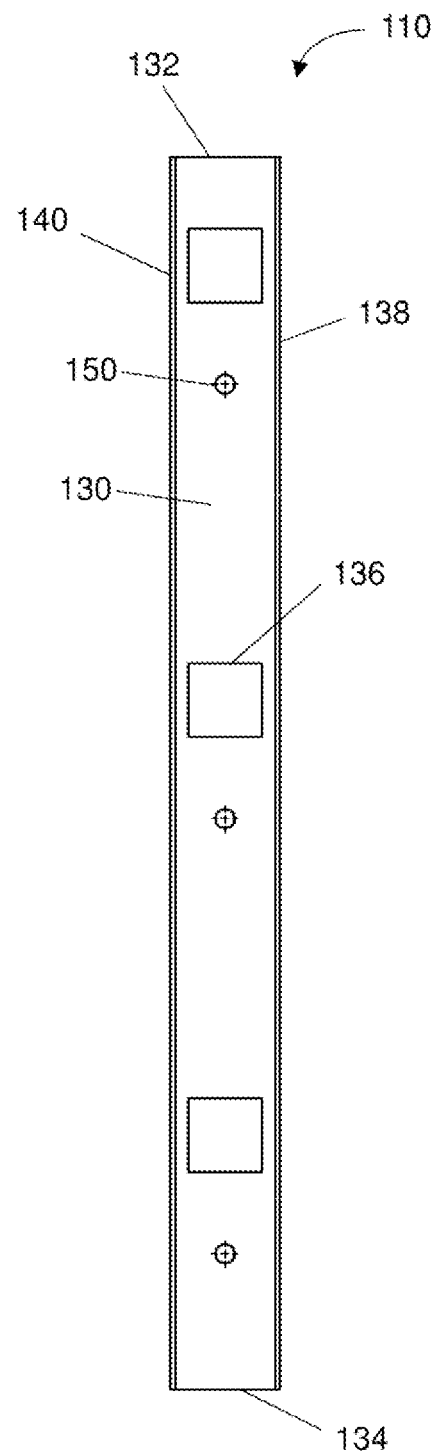
FIG. 14 is a front view of a vertical component of FIG. 13.

Assembly of the base component 108, the vertical components 110, and the horizontal components 112 is illustrated in FIGS. 7-12. Although reference is made to fasteners for coupling components together, in some embodiments, one or more components could be welded together. However, fasteners can be used for ease of assembly and disassembly. First, the vertical components 110 can be rigidly fixated to the opposing ends of the base component 108 in an opposing orientation. The vertical components 110 are rigidly fixated to the base component 108 in a substantially perpendicular orientation. As shown in FIG. 12, the flanges 138, 140 of the vertical component 110 can be slid or positioned over the extensions 120 of the base component 108. The base component 108 edge can be positioned against the inner surface of the central surface 130 of the vertical component 110, or until the openings 156, 158 of the vertical component 110 align with the openings 126, 128 of the base component 108.

Fasteners, e.g., bolts 184 and corresponding nuts 186, can be passed through the openings 126, 128, 156, 158 to rigidly secure the base component 108 to the vertical component 110. In the assembled configuration, the bottom surface 114 of the base component 108 defines the bottom surface of the assembly 102, with the bottommost edges of the vertical support 110 being vertically offset from the plane defining the bottom surface 114 of the base component 108. The two vertical components 110 can thereby be secured to the opposing proximal and distal ends of the base component 108, with the assembly defining a substantially U-shaped configuration when viewed from the side. Bolts 188 can be passed through openings 122, 124 in the base component 108 to secure the base component 108 to the top of a cabinet or any other structure.

Figure 10:
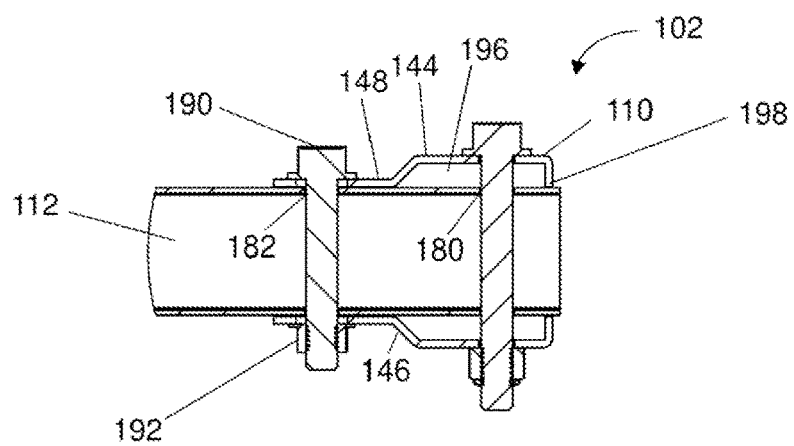
FIG. 10 is a cross-sectional, detailed view of a vertical support assembly of FIG. 9.
Figure 11:
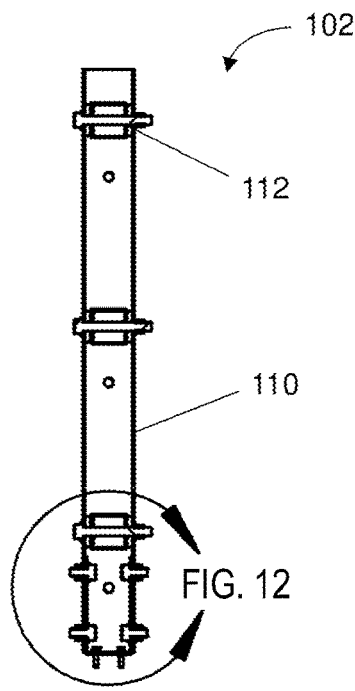
FIG. 11 is a cross-sectional, rear view of a vertical support assembly of FIG. 7.

FIGS. 10 and 12 illustrate details of the assembly of the horizontal component 112 with the vertical component 110. The horizontal component 112 is passed through the openings 136 in the vertical components 110 until the openings 176, 178 of the horizontal component 112 are aligned with the openings 152, 154 of one vertical component 110, and the openings 180, 182 of the horizontal component 112 are aligned with the openings 152, 154 of the other vertical component 110. The narrowing design of the mounting bracket 142 fits over and against the side walls 164, 166 of the horizontal component 112 to provide support and maintain alignment of the components 110, 112. The bottom edge of the opening 136 in the vertical component 110 abut and support the bottom surface 162 of the horizontal component 112 when the horizontal component 112 is at least partially passed through the opening 136 (see, e.g., overlap area 198 of FIG. 10). This engagement provides structural support to the assembly 102 when additional weight, e.g., from cables, is placed on the assembly 102.

Figure 8:
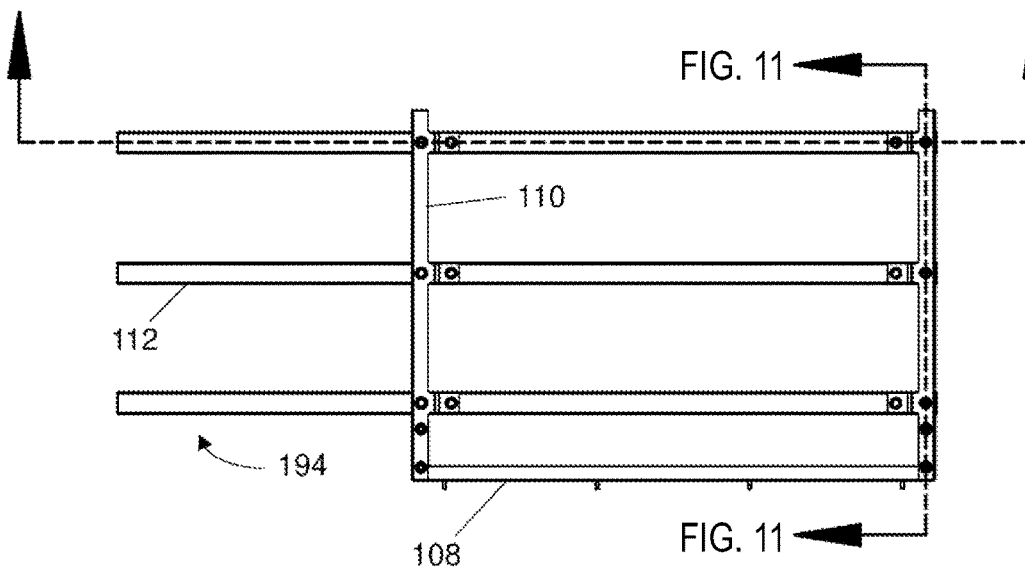
FIG. 8 is a side view of a vertical support assembly of FIG. 7.
Figure 9:
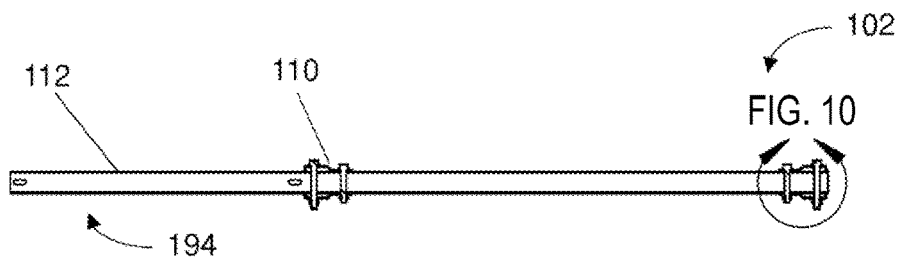
FIG. 9 is a cross-sectional, top view of a vertical support assembly of FIG. 7.

Fasteners, e.g., bolts 190 and corresponding nuts 192, can be passed through the openings 152, 154, 176, 178, 180, 182 to rigidly fixate/couple the horizontal component 112 to the vertical components 110. This process can be repeated three times to secure the three horizontal components 112 in the perpendicular orientation to the vertical components 110, as illustrated in FIG. 8. In the resulting assembly 102, one end of the horizontal component 112 is substantially flush with the end of the vertical component 110, except for the edge support provided by the extension of the horizontal component 112 through the opening 136. The opposing end of the horizontal component 112 extends beyond the second vertical component 110 to define a cantilevered section 194 of the assembly 102.

As shown in FIG. 10, the third section 148 of the mounting bracket 142 is positioned directly against the outer surface of the opposing walls of the horizontal component 112. At least a portion of the end of the horizontal component 112 remains within the wider area of the vertical component 110, and therefore includes a gap 196 between the inner walls of the flanges 138, 140 and the outer walls of the horizontal component 112. The gap 196 allows component 110 to maintain its integrity while permitting component 112 to pass through it.

Figure 3:
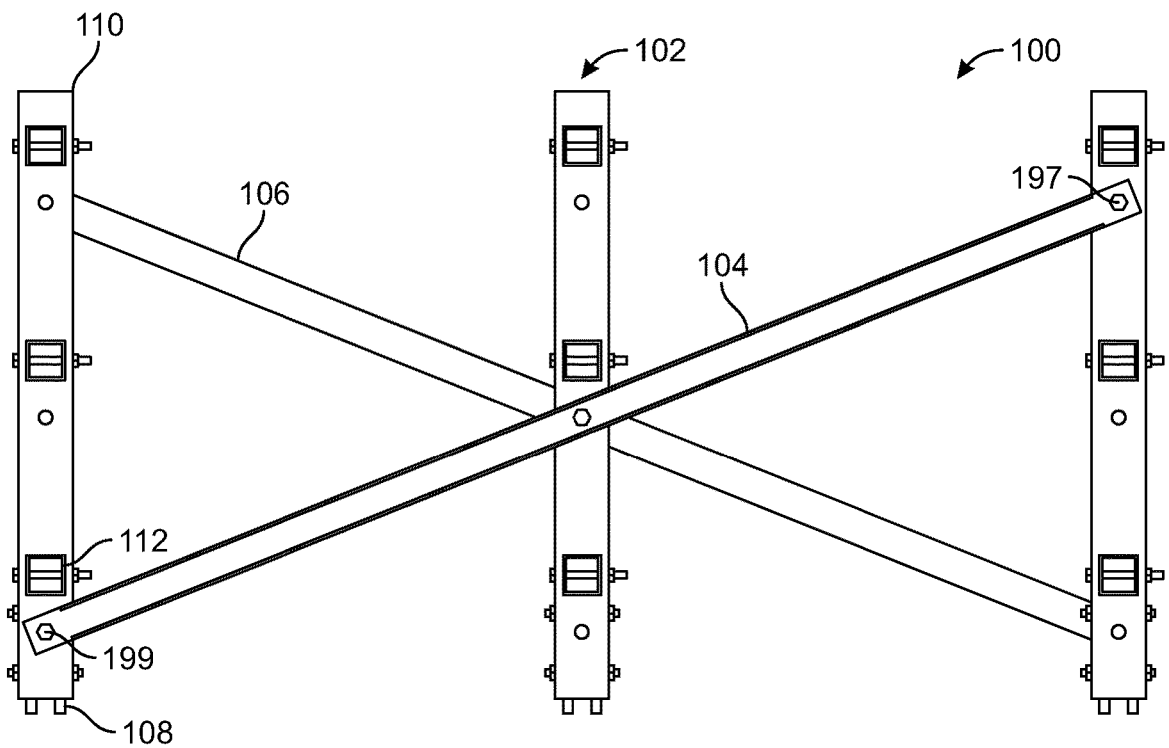
FIG. 3 is a rear view of an exemplary overhead rack support of FIG. 1.
Figure 4:
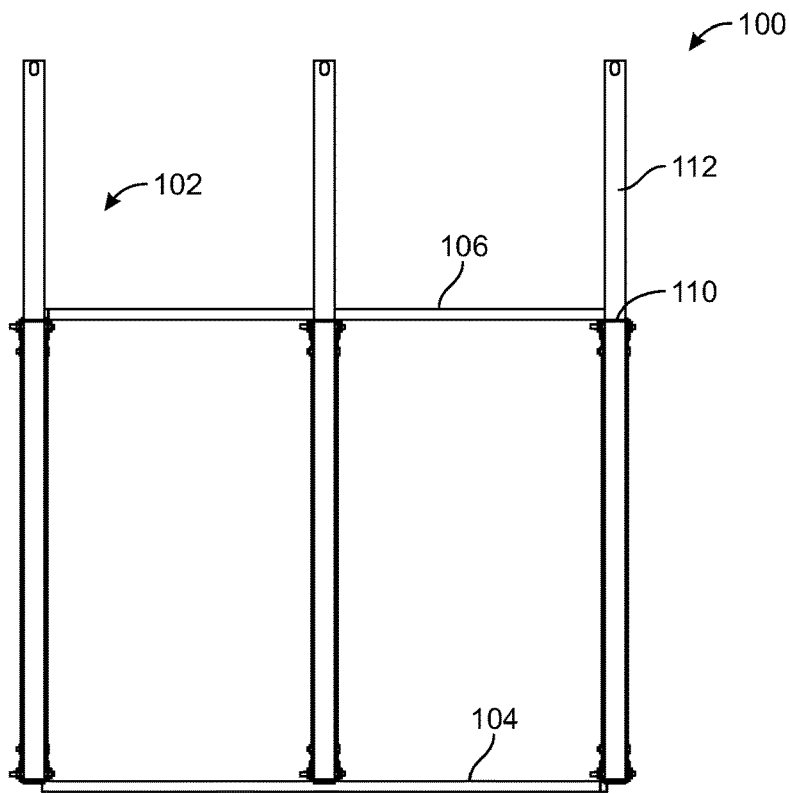
FIG. 4 is a top view of an exemplary overhead rack support of FIG. 1.
Figure 5:
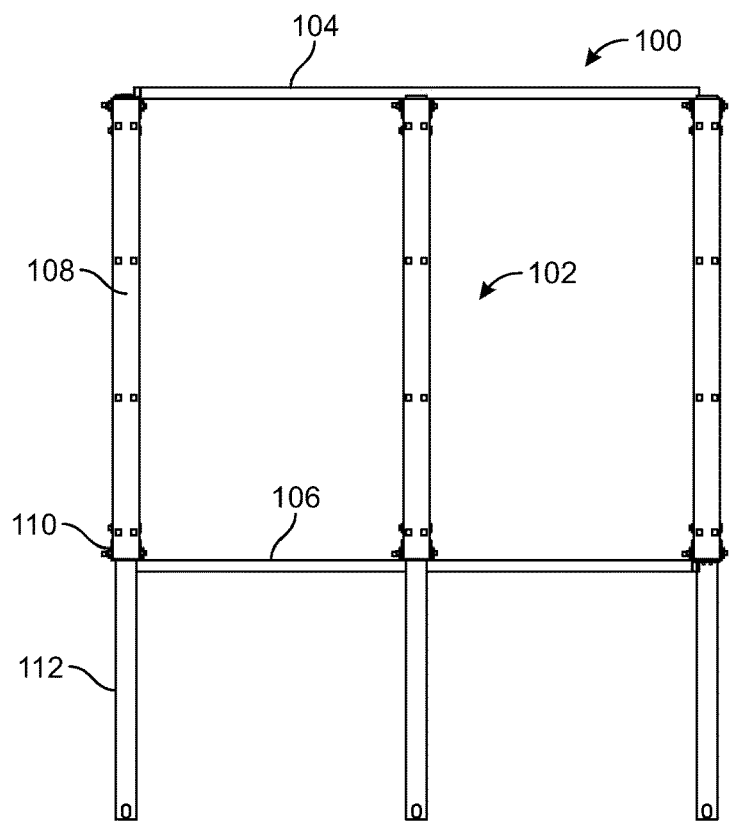
FIG. 5 is a bottom view of an exemplary overhead rack support of FIG. 1.
Figure 6:
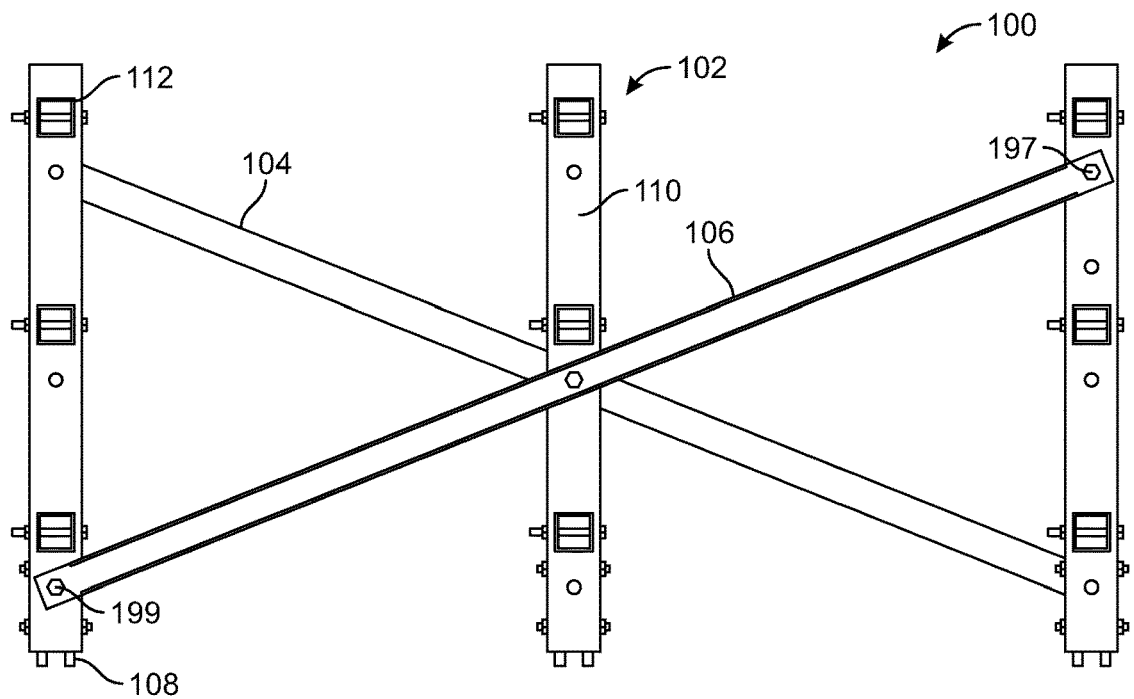
FIG. 6 is a front view of an exemplary overhead rack support of FIG. 1.
Figure 7:
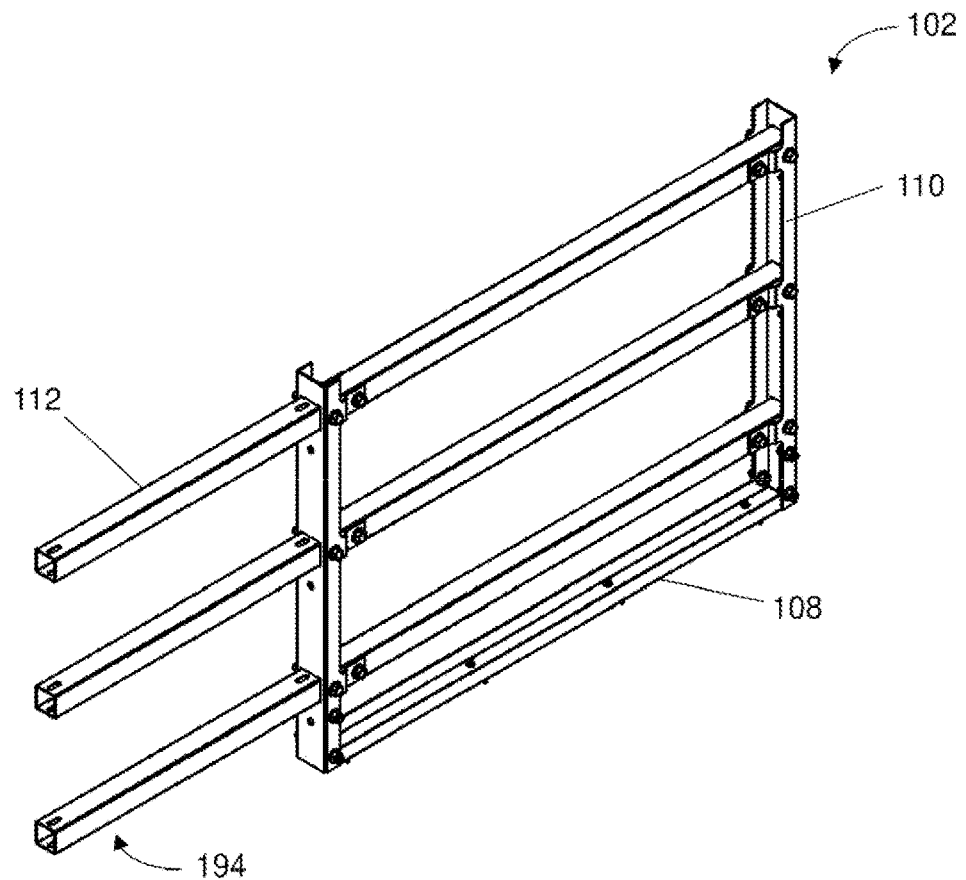
FIG. 7 is a perspective view of a vertical support assembly of an exemplary overhead rack support of FIG. 1.

After assembly of the horizontal components 112 with the vertical components 110 is complete, the braces 104, 106 can be mounted to the vertical components 110 using openings 150 to form the support 100 to provide lateral support. With reference to FIGS. 3 and 6, each brace 104, 106 defines a generally planar, elongated body with openings 197 at opposing ends and an opening 200 at the center of the elongated body. As shown in FIGS. 1-6, the braces 104, 106 can be oriented in opposing directions relative to each other and on opposing sides of the support 100, and bolts 199 can be used to secure each brace 104, 106 at each of the openings 197 aligned with openings 150 of the vertical components 110.

Figure 23:
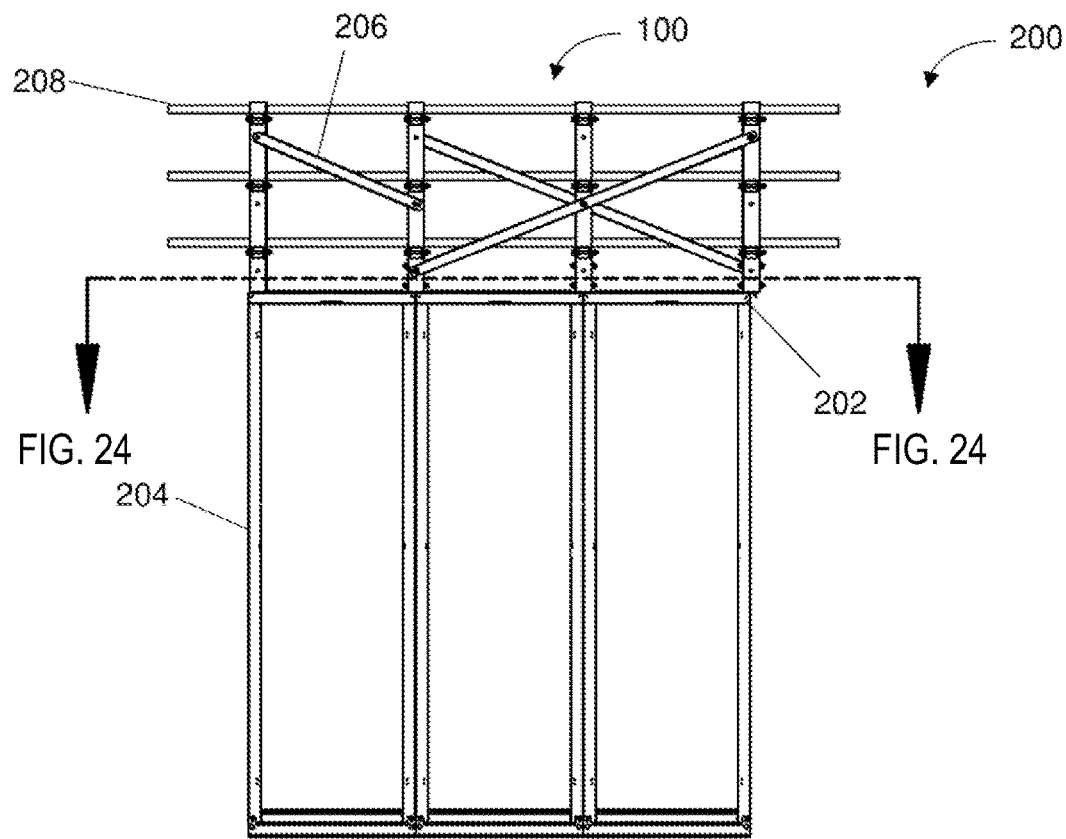
FIG. 23 is a front view of an exemplary overhead rack support coupled to a top surface of cabinets.
Figure 24:
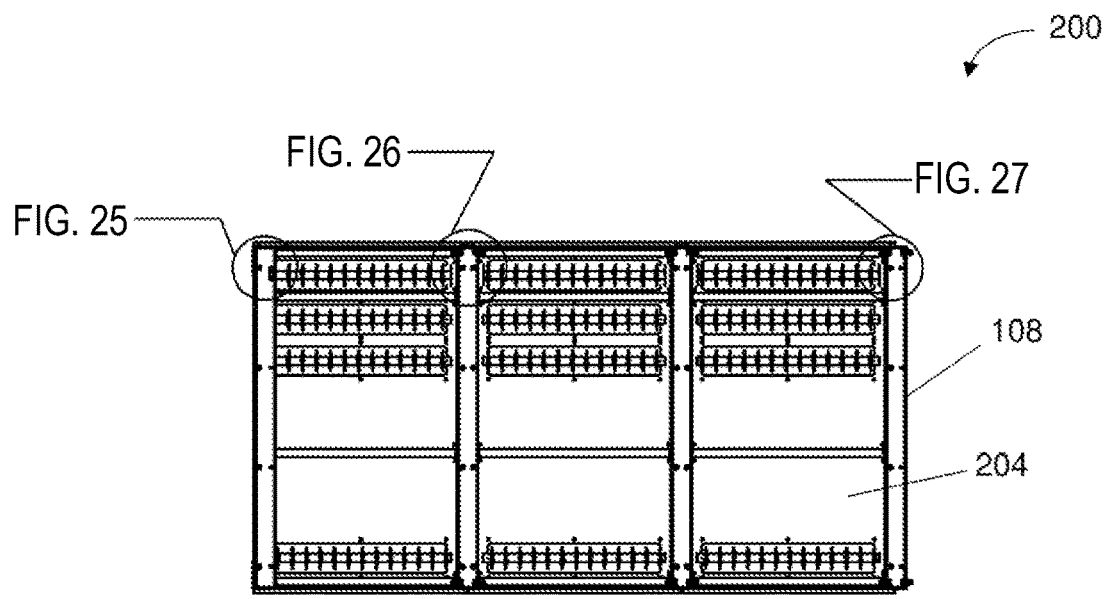
FIG. 24 is a cross-sectional, top view of an exemplary overhead rack support installation of FIG. 23.

Although illustrated as coupling three assemblies 102 together to form the support 100, in some embodiments, the braces 104, 106 can be of different lengths to allow for coupling of two or four assemblies together. For example, FIG. 23 shows a system or assembly 200 including the support 100 coupled to the top surface 202 of three cabinets 204. Although the support 100 including three assemblies 102 is dimensioned to fit over two adjacently positioned cabinets 204, a fourth assembly 102 has been added to the support 100 in FIG. 23 and a smaller brace 206 is used to connect the additional assembly 102 to the support 100, this time using only the top and middle openings 150 of the vertical components 110. The additional assembly 102 allows for the support 100 to be mounted to the top surface 202 of three adjacently positioned cabinets 204. The simple assembly of the support 100 allows for the components of the support 100 to be assembled in the field in a customized manner depending on the needs of the user. The cantilevered sections 194 of the support 100 can receive one or more cable supports 208 (see, e.g., FIG. 23), the details of which will be discussed below. The cable support 208 can releasably coupled to the top surface of the cantilevered sections 194 and can be configured to receive thereon cables passing into and out of the cabinets 204 for routing in the data center. In some embodiments, each level or tier of cable support 208 can be used for a specific type of cable, e.g., copper, fiber, power, or the like. In some embodiments, only one or more tiers of cable support 208 could be used (rather than the three tiers illustrated in the figures).

Figure 25:
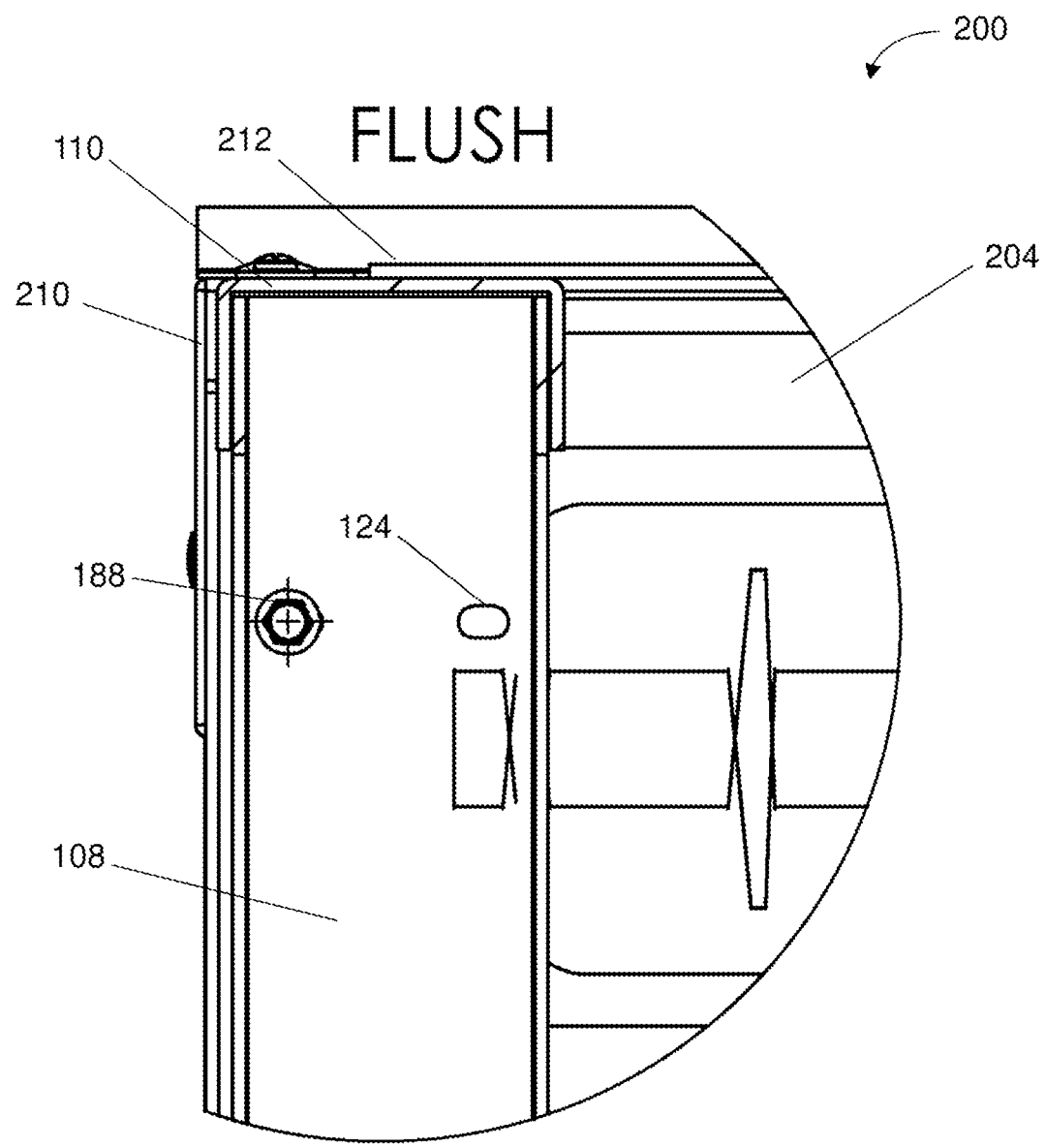
FIG. 25 is a cross-sectional, detailed view of an exemplary overhead rack support installation of FIG. 23.
Figure 26:
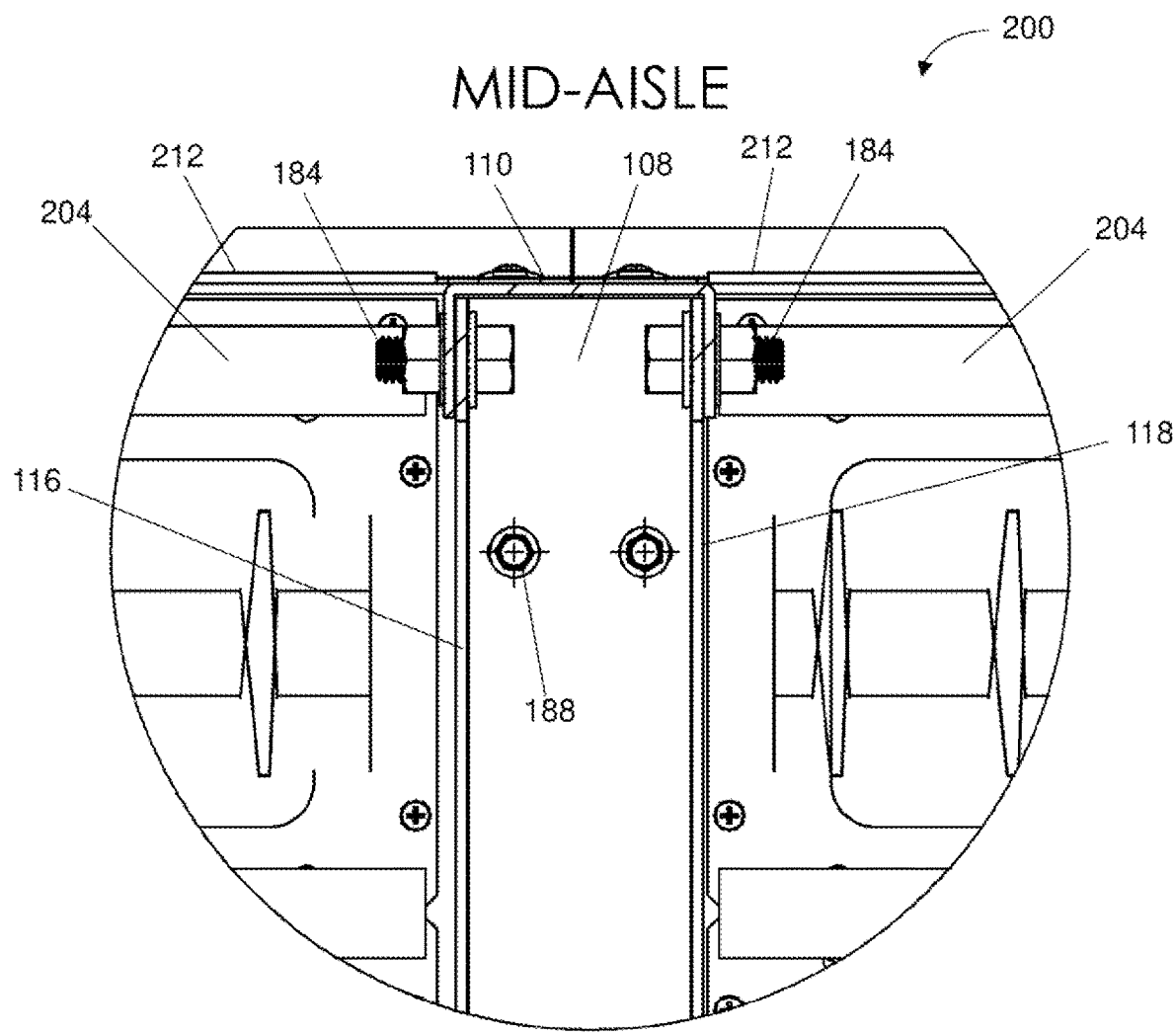
FIG. 26 is a cross-sectional, detailed view of an exemplary overhead rack support installation of FIG. 23.
Figure 27:
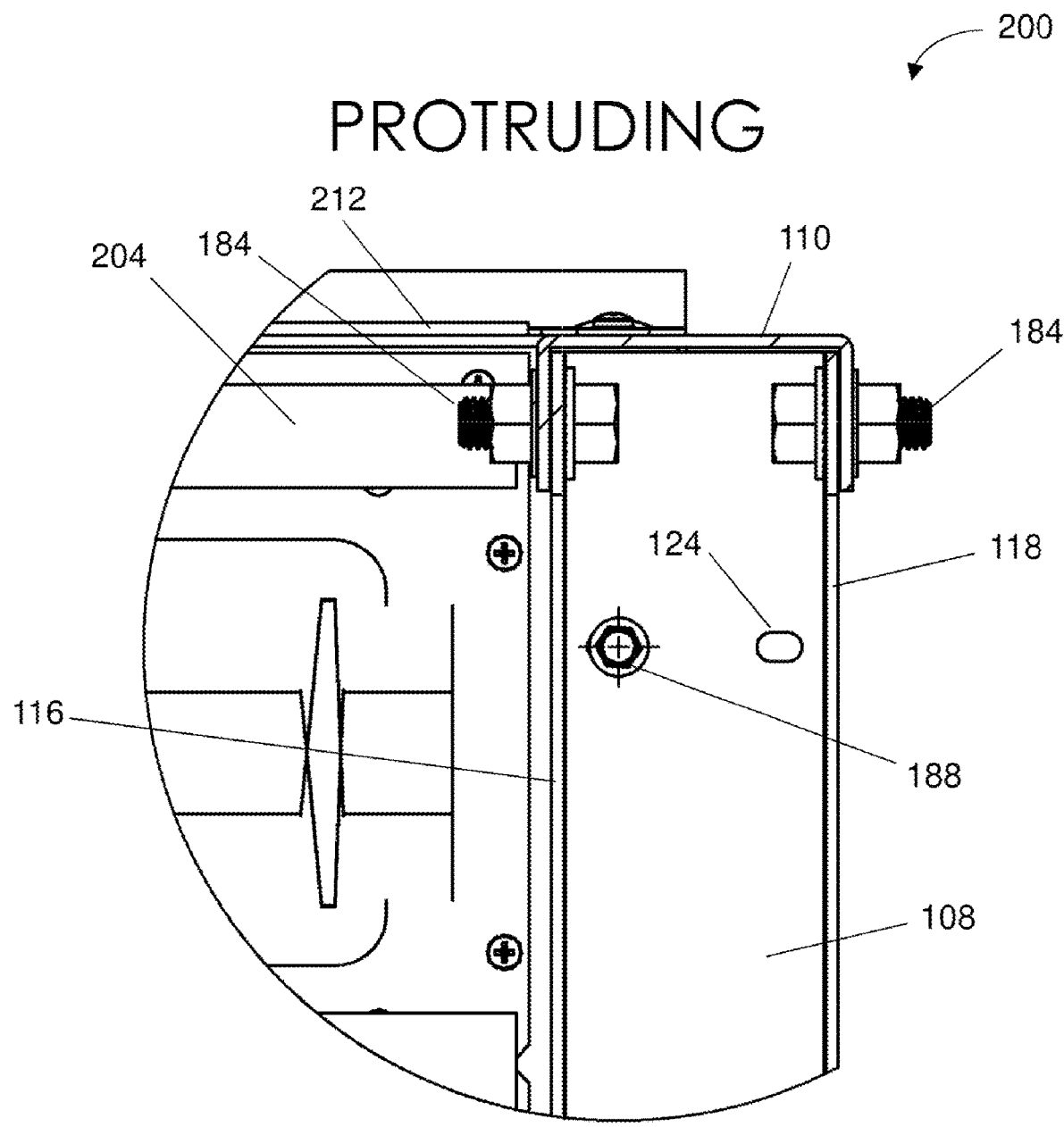
FIG. 27 is a cross-sectional, detailed view of an exemplary overhead rack support installation of FIG. 23.

With reference to FIGS. 23-27, the support 100 can be mounted to the top surface 202 of the cabinets 204 in a variety of ways, e.g., in a flush configuration illustrated in the detail of FIG. 25, in a mid-aisle configuration illustrated in the detail of FIG. 26, or in a protruding configuration illustrated in the detail of FIG. 27. In the flush configuration of FIG. 25, the corner defined by the vertical component 110 can be substantially aligned with the side and front edges or surfaces 210, 212 of the cabinet 204. The base component 108 therefore extends in an aligned manner relative to the side surface 212 of the cabinet 204. The fasteners 188 can then be used to secure the base component 108 to the top surface 202 of the cabinet 204. The top surface 202 of the cabinet 204 provides support along the entire surface area of the base component 108.

In the mid-aisle configuration of FIG. 26, the top surface 202 of the cabinets 204 can include a gap or space configured to receive the width of the base component 108. The front edge of the vertical component 110 can be aligned with the front surface 212 of the cabinets 204 and fasteners 188 can be used to secure the base component 108 to both cabinets 204. The base component 108 can be substantially centrally positioned over the adjacent cabinets 204. The base component 108 can thereby assist in maintaining the cabinets 204 positioned adjacent to each other. The entire surface area of the base component 108 is supported by the two cabinets 204, with each cabinet 204 providing support to about half of the base component 108.

In the protruding configuration of FIG. 27, the front edge of the vertical component 110 can be aligned with the front surface 212 of the cabinet 204, with half of the base component 108 positioned against the top surface 202 and the remaining half overhanging without support from below. As such, only half of the surface area of the base component 108 is supported by the cabinet 204. Fasteners 188 can be used to secure the base component 108 to the top surface 202.

Figure 28:
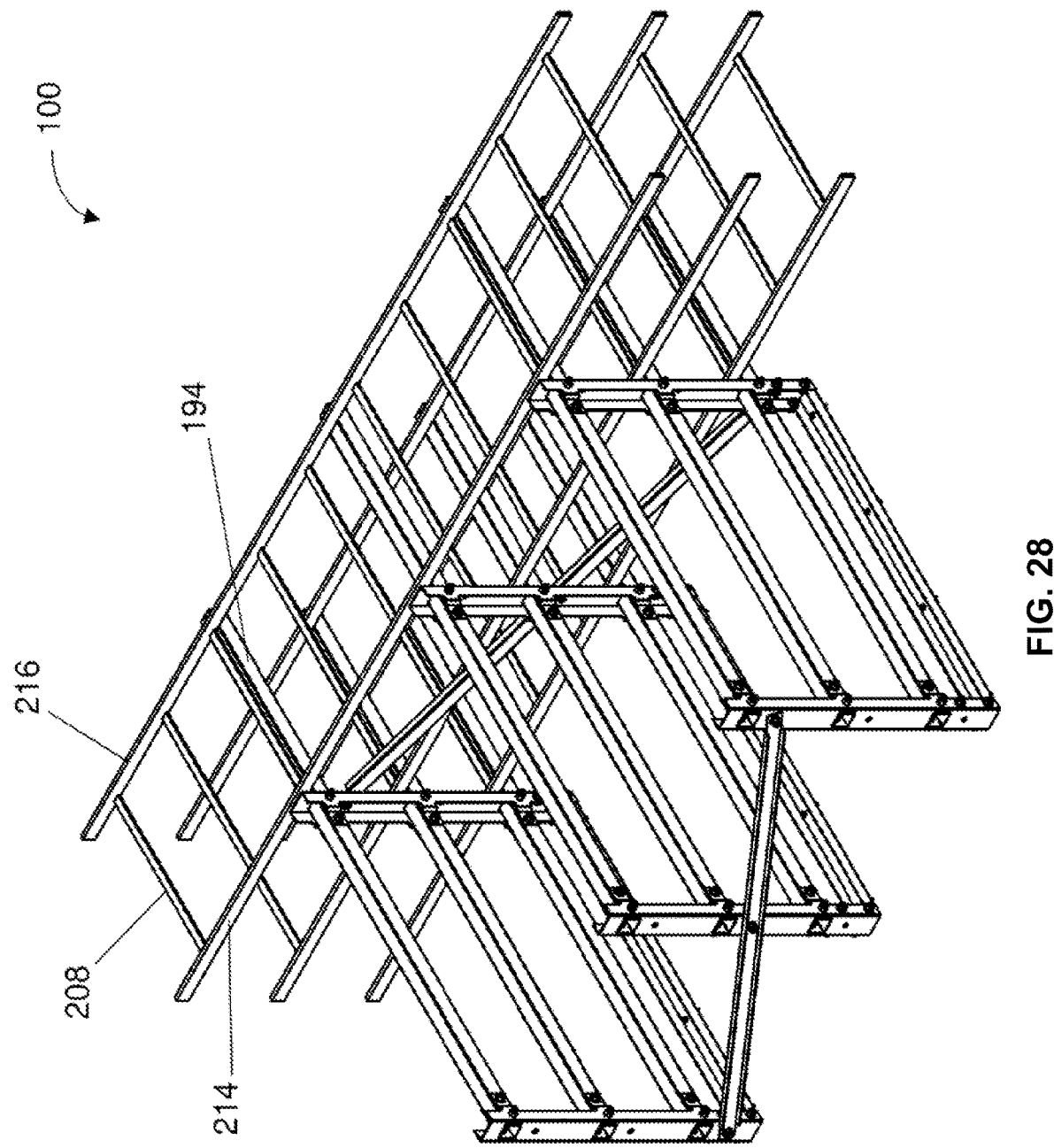
FIG. 28 is a perspective view of an exemplary overhead rack support of FIG. 1, including cable supports positioned on cantilever extensions.

FIG. 28 is a perspective view of the support 100 including the cable supports 208 mounted to the cantilevered sections 194. The non-overhanging or non-cantilevered structure of the support 100 can be configured to be mounted to the top surface 202 of the cabinets 204 and provides structure capable of receiving the weight from cables on the cantilevered sections 194. Each row of cantilevered sections 194 is configured to receive the cable support 100, and the cable support 208 in turn receives the cables for routing thereon. In some embodiments, each cable support 208 is capable of receiving about 50 $lb_f$ in weight.

Each cable support 208 can define a substantially ladder-shaped configuration. For example, the cable support 208 can include two elongated side beams 214, 216, and multiple spaced cross-beams 218. The cross-beams 218 can be secured to the top wall 160 of the horizontal components 112. For example, the cross-beams 218 can include openings or slots complementary to the openings 172, 174 of the horizontal component 112, and fasteners can be used to secure the cross-beams 218 to the horizontal component 112 through the openings 172, 174 (see, e.g., FIG. 17).

Figure 29:
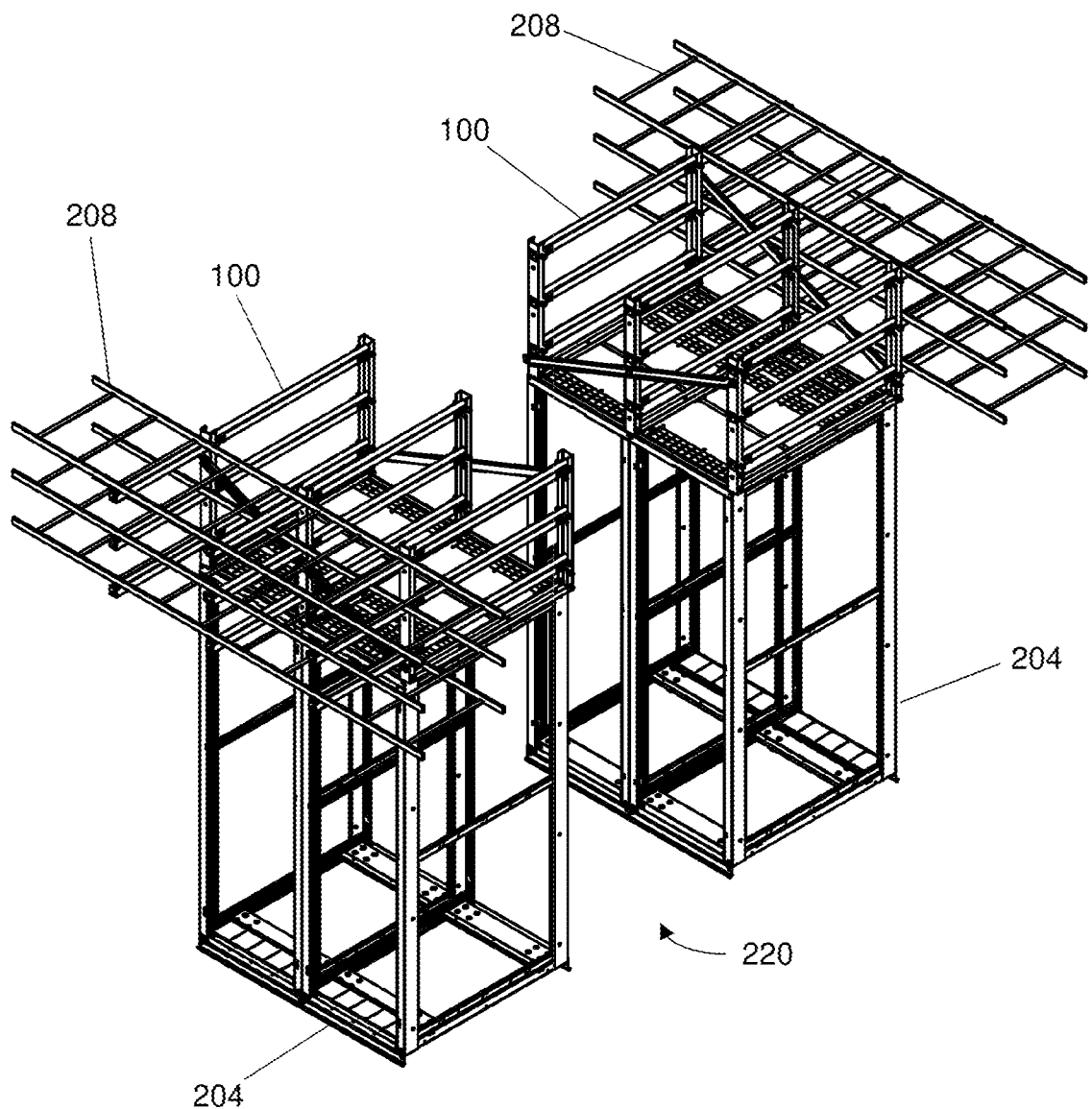
FIG. 29 is a perspective view of exemplary overhead rack supports of FIG. 28 coupled to top surfaces of cabinets positioned on opposing sides of an aisle.
Figure 30:
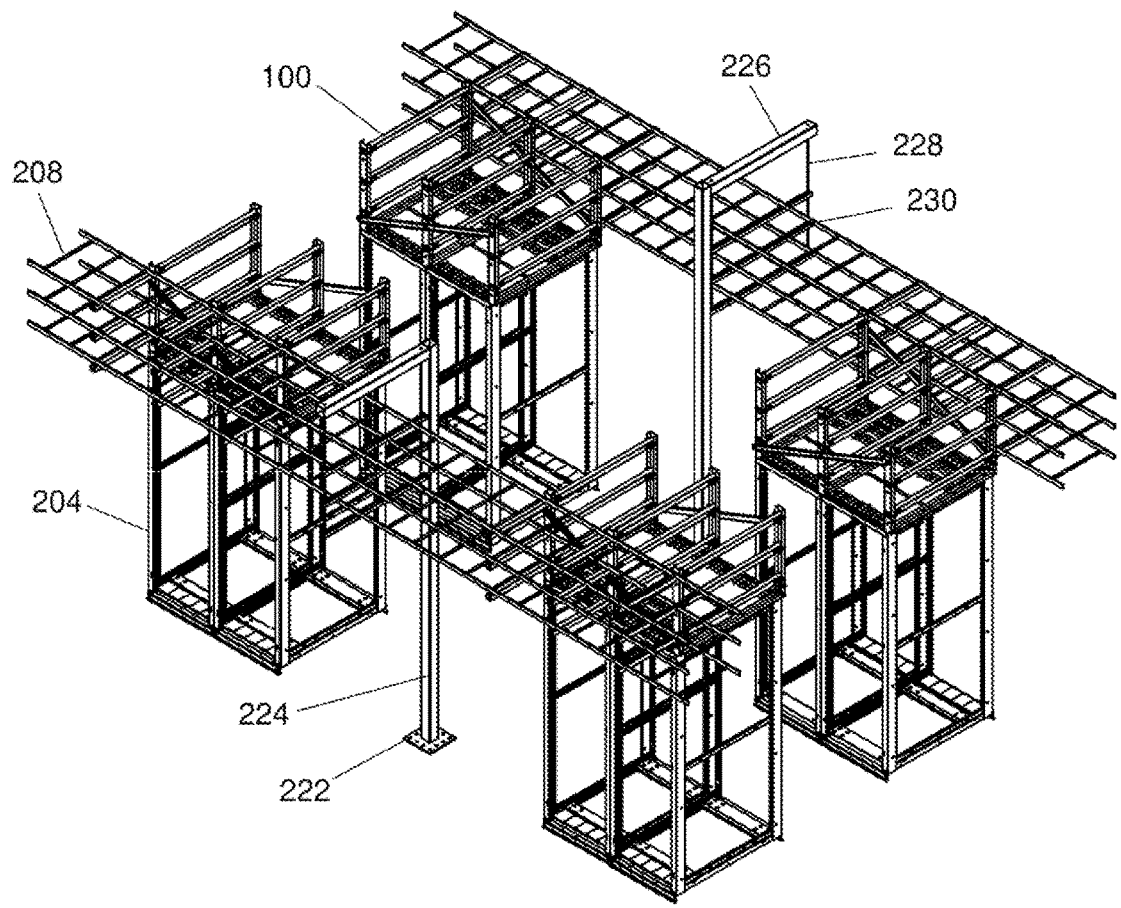
FIG. 30 is a perspective view of exemplary overhead rack supports of FIG. 28 coupled to top surfaces of cabinets positioned on opposing sides of aisles, including support posts for cable supports extending over the aisles.
Figure 31:
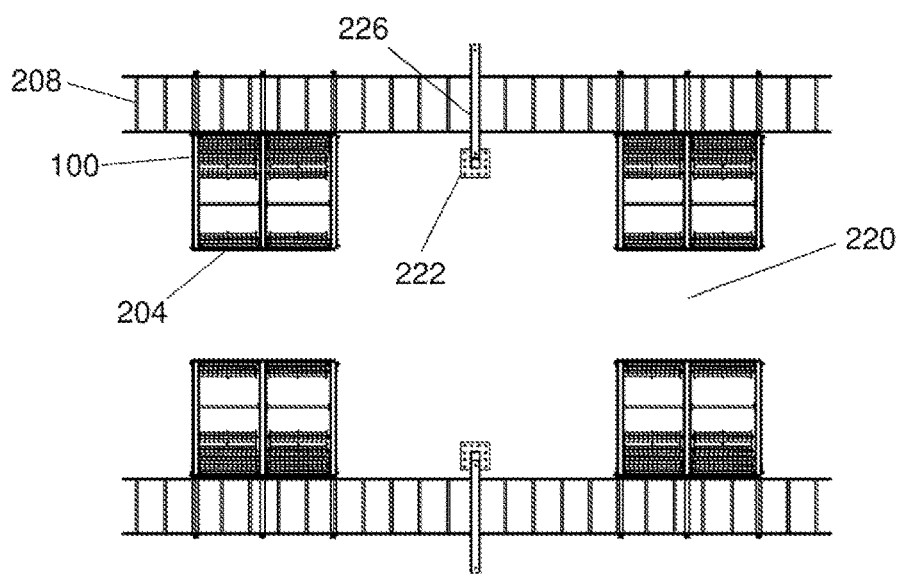
FIG. 31 is a top view of the exemplary overhead rack support installation of FIG. 30.

FIGS. 29-31 show perspective and top views of the support 100 with cable supports 208 mounted to the top surface of cabinets 204. In the smaller installation shown in FIG. 29, no additional supporting elements are needed to maintain the position of the supports 100, and the passageway or aisle 220 between the cabinets 204 is maintained clear from obstructions. For the more complex installation shown in FIGS. 30-31 in which multiple aisles 220 exist between the groups of cabinets 204 and the cable supports 208 need to extend over the aisles 220, additional support structures can be used.

The additional structure can include a base 222 mounted to the floor of the facility, a main vertical beam 224 extending perpendicularly from the base 222, an overhanging beam 226 extending perpendicularly from the top of the main vertical beam 224, and a cable element 228 extending from the end of the overhanging beam 226. In some embodiments, the cable element 228 can detachably couple to the cable supports 208 to provide additional support from above to the assembly. In some embodiments, the additional structure can include three beams 230 extending perpendicularly from the main vertical beam 224 and connecting to the cable element 228, with each of the beams 230 supporting the respective cable support 208 from the bottom. The additional supports ensure that the cable supports 208 and supports 100 are capable of maintaining the weight from cable management, while keeping the aisles 220 clear for passage (except for the base 222 and beam 224 installation). With the supports 208 receiving all cables, the area immediately above the cabinets 204 remains sufficiently clear to allow for maintenance clearance, and to provide a sufficient delta/gap between the top of the cabinet 204 and where cables are maintained to have the proper bend radius for cables.

FIGS. 32-35 are perspective, side, top and front views of an exemplary overhead rack support 300 (hereinafter "support 300"). The support 300 can be substantially similar in structure and function, except for the distinctions noted herein. As such, same reference numbers are used to represent the same structures. Rather than having a single cantilevered section 194, the horizontal component 302 of the support 300 includes cantilevered sections 194 on both, opposing sides. For example, with reference to FIG. 18, the horizontal component 302 can include the same structure as the horizontal component 112, except the left side would have the same cantilevered section 194 extending from edge 168. The openings 176, 178, 180, 182 can be similarly assembled with the vertical components 110, with the bottom edge of the opening 136 in the vertical component 110 supporting the horizontal component 302.

As illustrated in FIGS. 32-35, the cantilevered sections 194 extend on opposing sides of the assembly, allowing for cable supports 208 to be coupled to the support 300 on both sides. This provides additional options for routing cables on different sides of the support 300. For example, when coupled to the top of cabinets 204, one cantilevered section 194 can extend behind the cabinet 204 and the other cantilevered section 194 can extend in front of the cabinet 204, all while maintaining the aisle between cabinets 204 free from obstructions.

Figure 36:
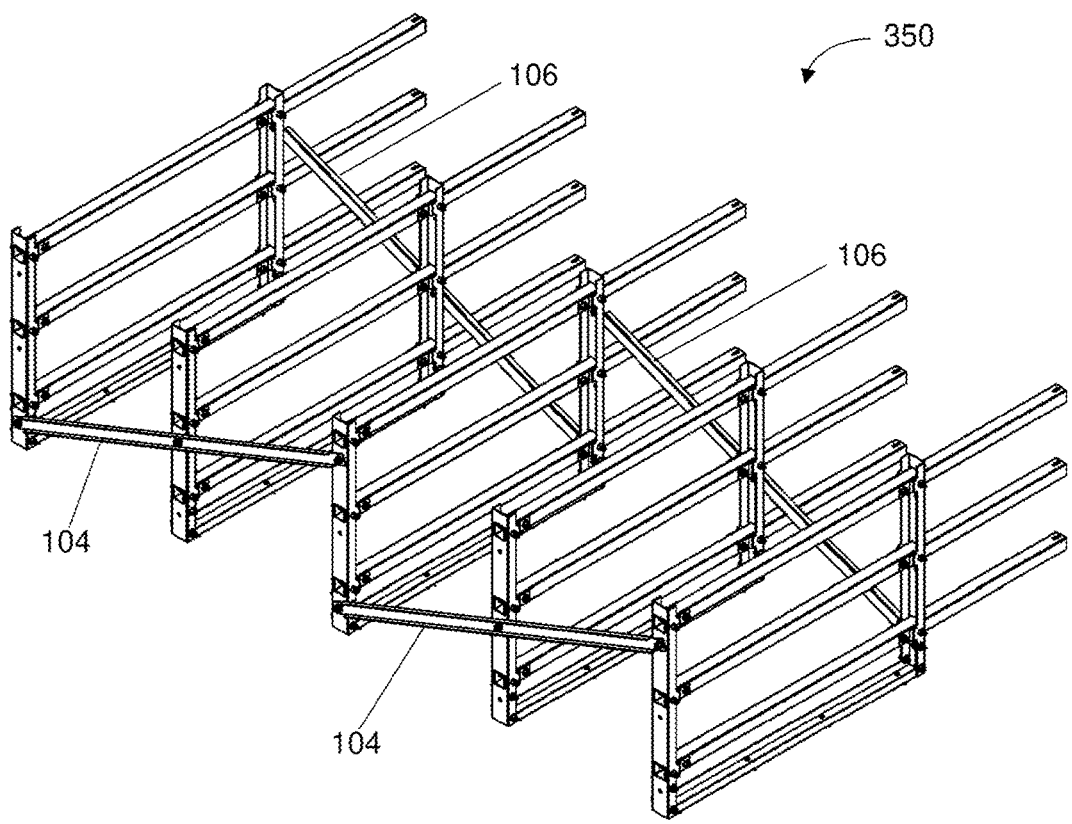
FIG. 36 is a perspective view of multiple exemplary overhead rack supports of FIG. 1.
Figure 37:
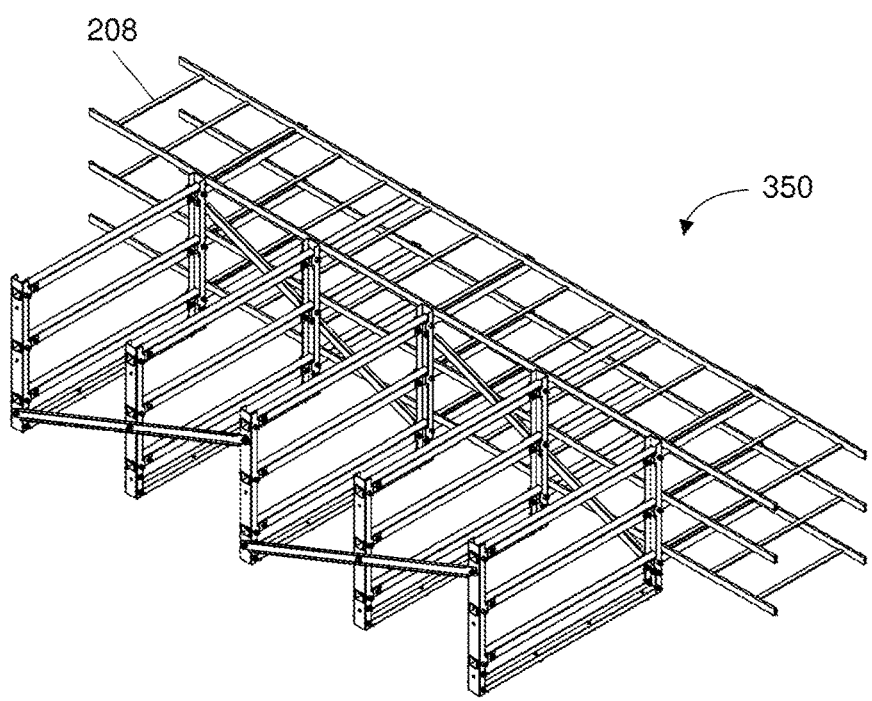
FIG. 37 is a perspective view of multiple exemplary overhead rack supports of FIG. 36, including cable supports positioned on cantilever extensions.

FIGS. 36-37 are perspective views of multiple supports 100 coupled together to form an assembly 350. Based on the size requirements of the user (e.g., based on the number of cabinets 204), multiple supports 100 (or partial assemblies of support 100) can be connected together to accommodate the cable management needs. Similar assembly could be made of the double cantilevered section design of the support 100.

Figure 38:
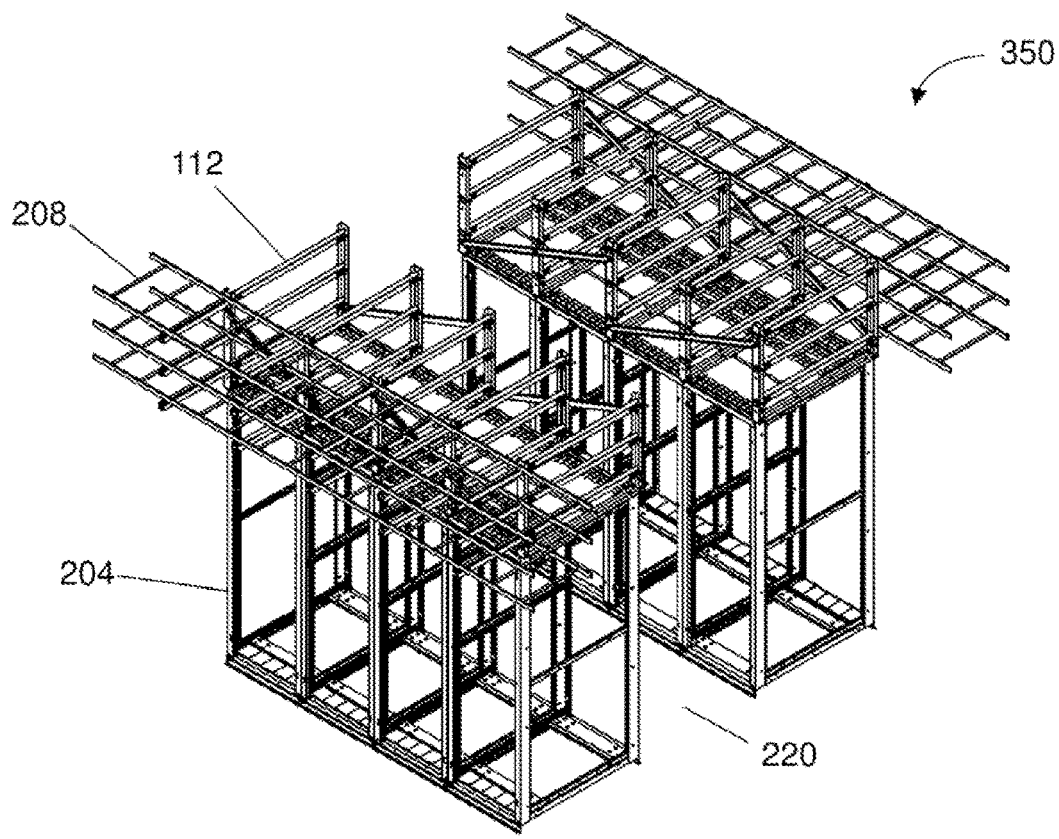
FIG. 38 is a perspective view of multiple exemplary overhead rack supports of FIG. 36 coupled to top surfaces of cabinets positioned on opposing sides of aisles.
Figure 39:
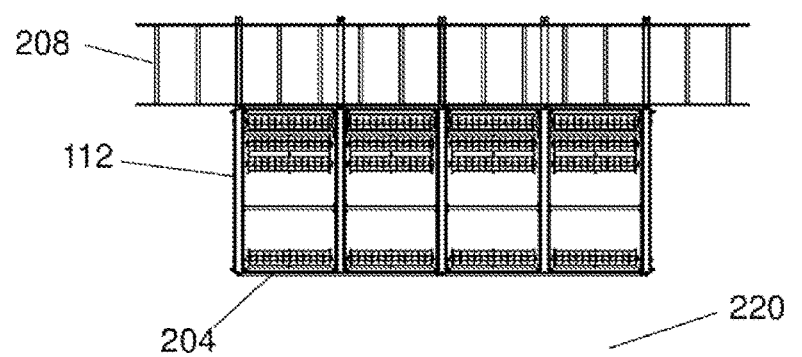
FIG. 39 is a top view of the exemplary overhead rack support installation of FIG. 38.
Figure 39:
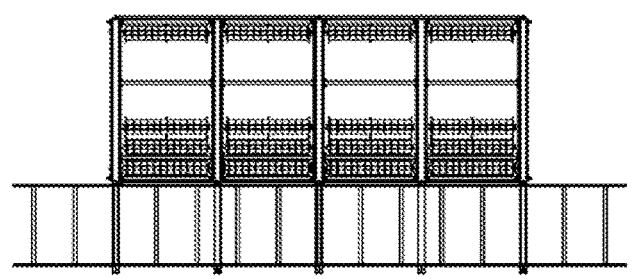
Figure 40:
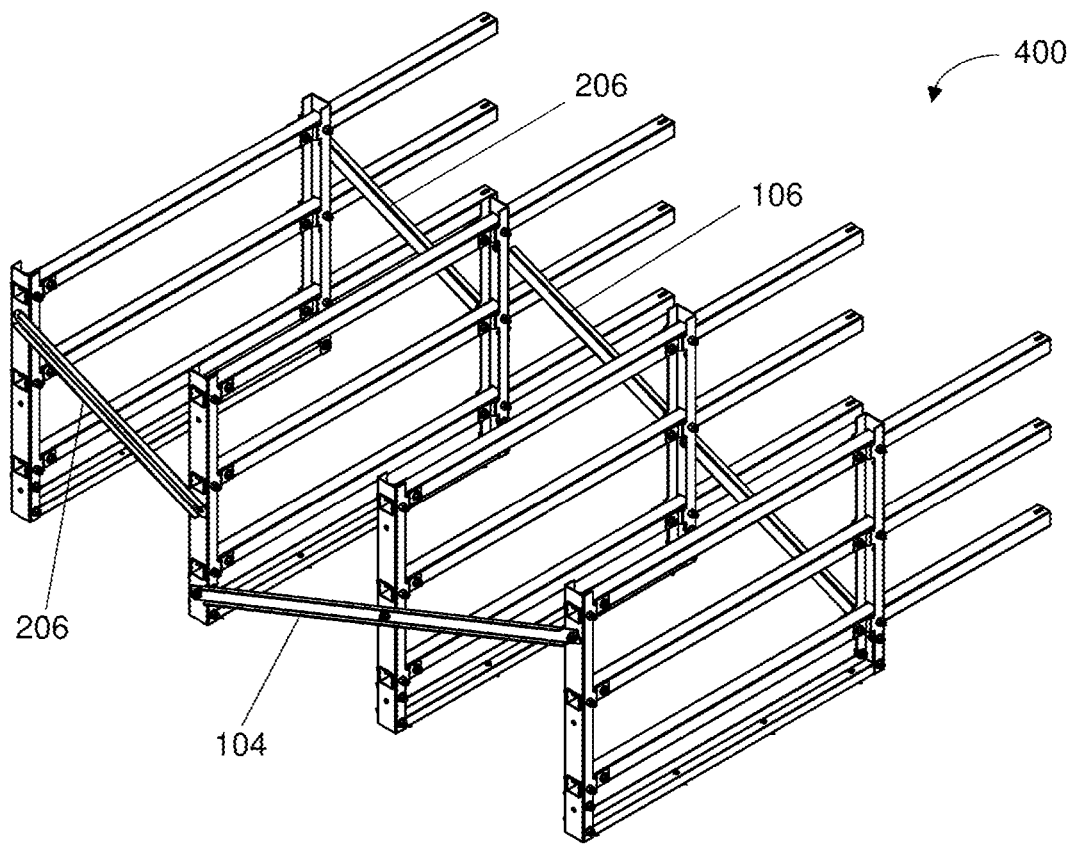
FIG. 40 is a perspective view of an exemplary overhead rack support of FIG. 1 assembled with a partial overhead rack support and including a single side of cantilever extensions.
Figure 41:
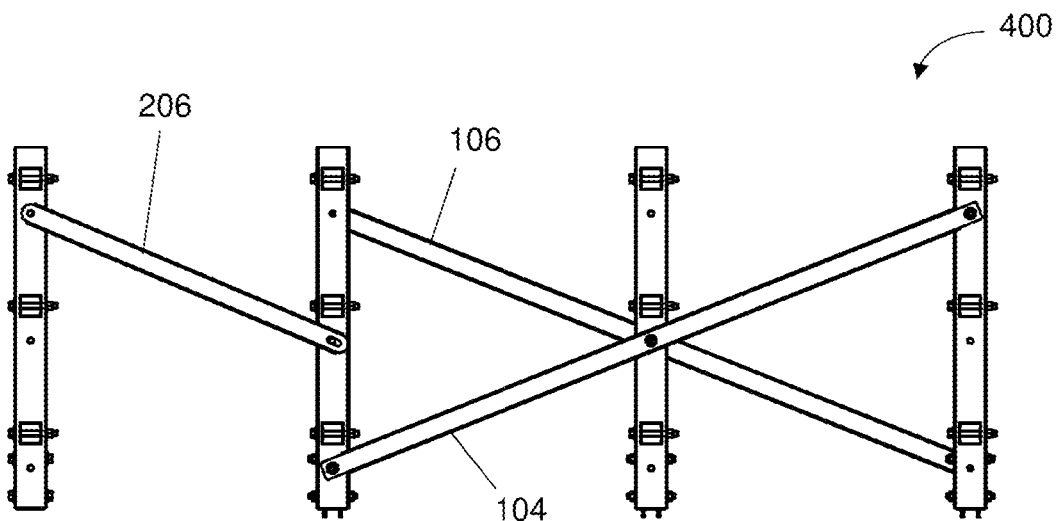
FIG. 41 is a front view of an exemplary overhead rack support assembly of FIG. 40.
Figure 42:
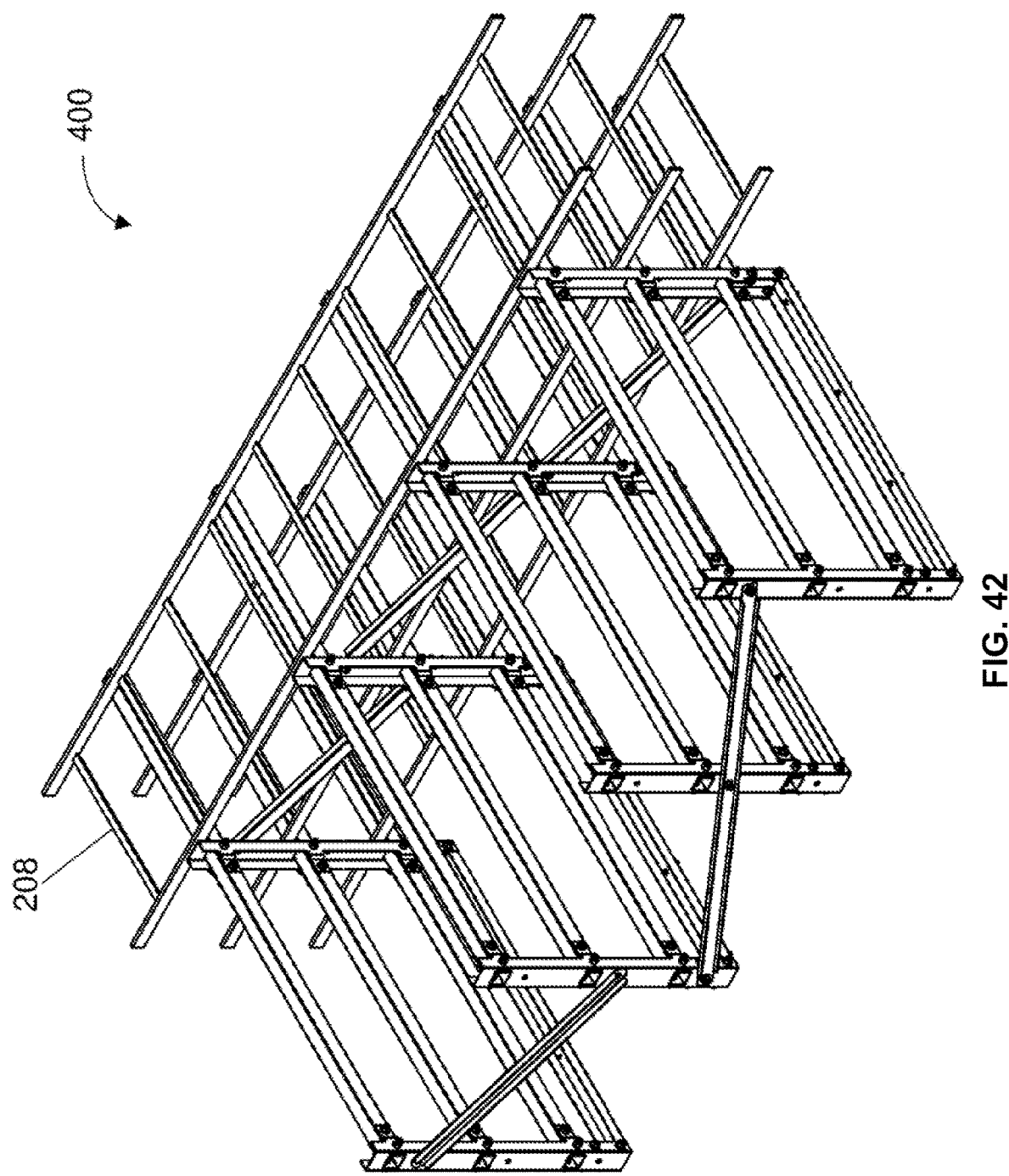
FIG. 42 is a perspective view of an exemplary overhead rack support assembly of FIG. 40, including cable supports positioned on cantilever extensions.
Figure 43:
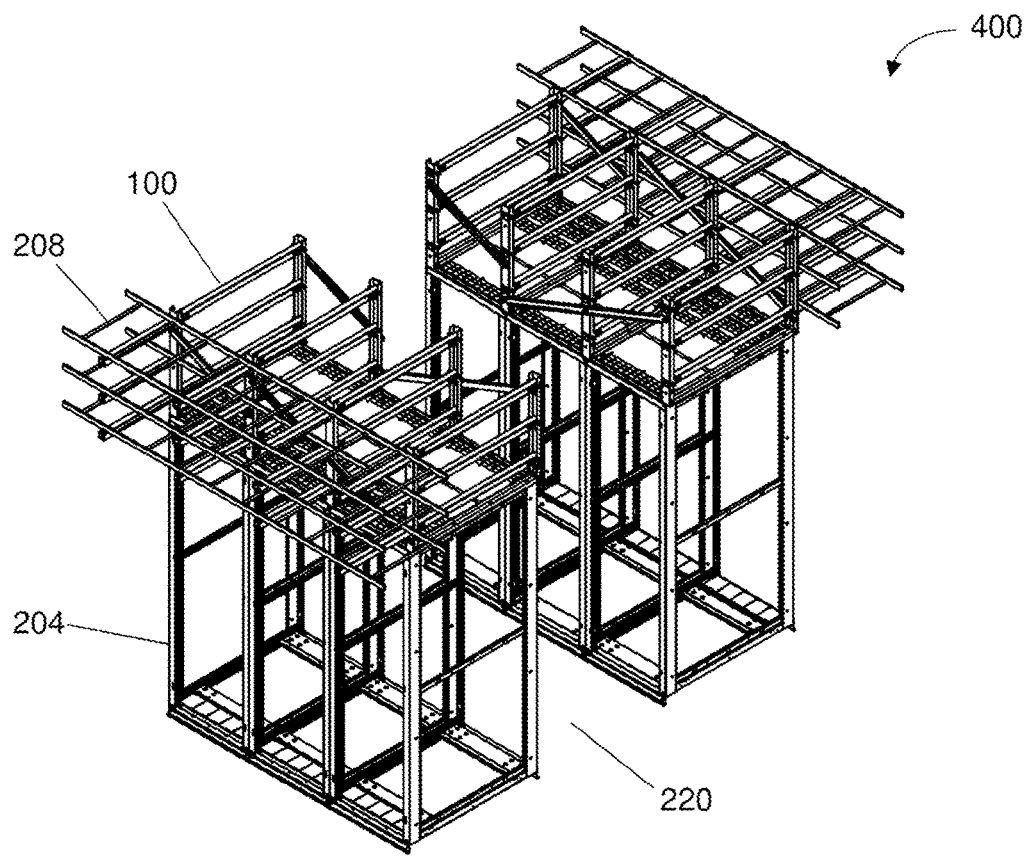
FIG. 43 is a perspective view of an exemplary overhead rack support assembly of FIG. 40 coupled to top surfaces of cabinets positioned on opposing sides of aisles.
Figure 44:
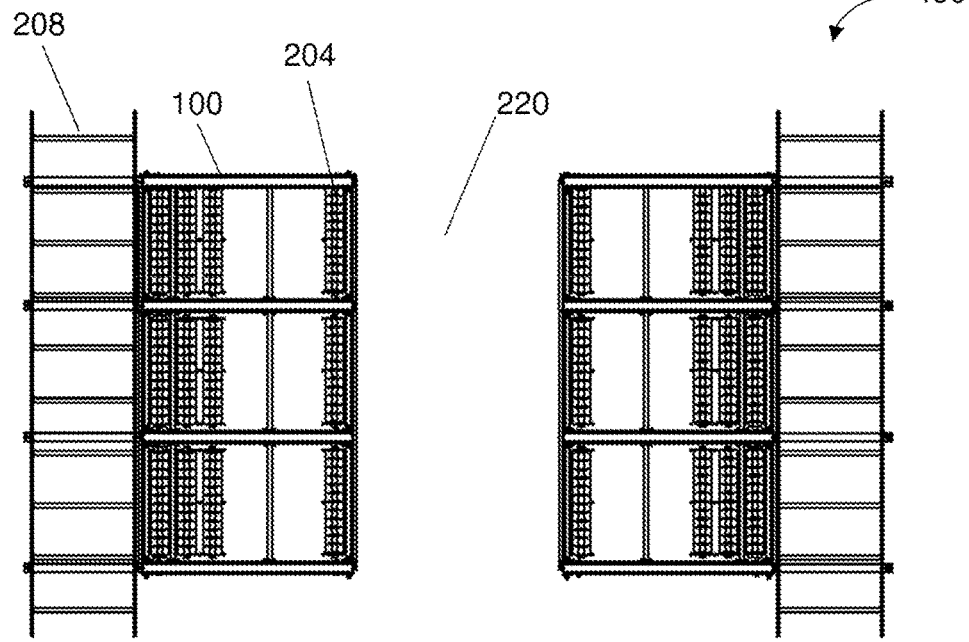
FIG. 44 is a side view of the exemplary overhead rack support installation of FIG. 43.
Figure 45:
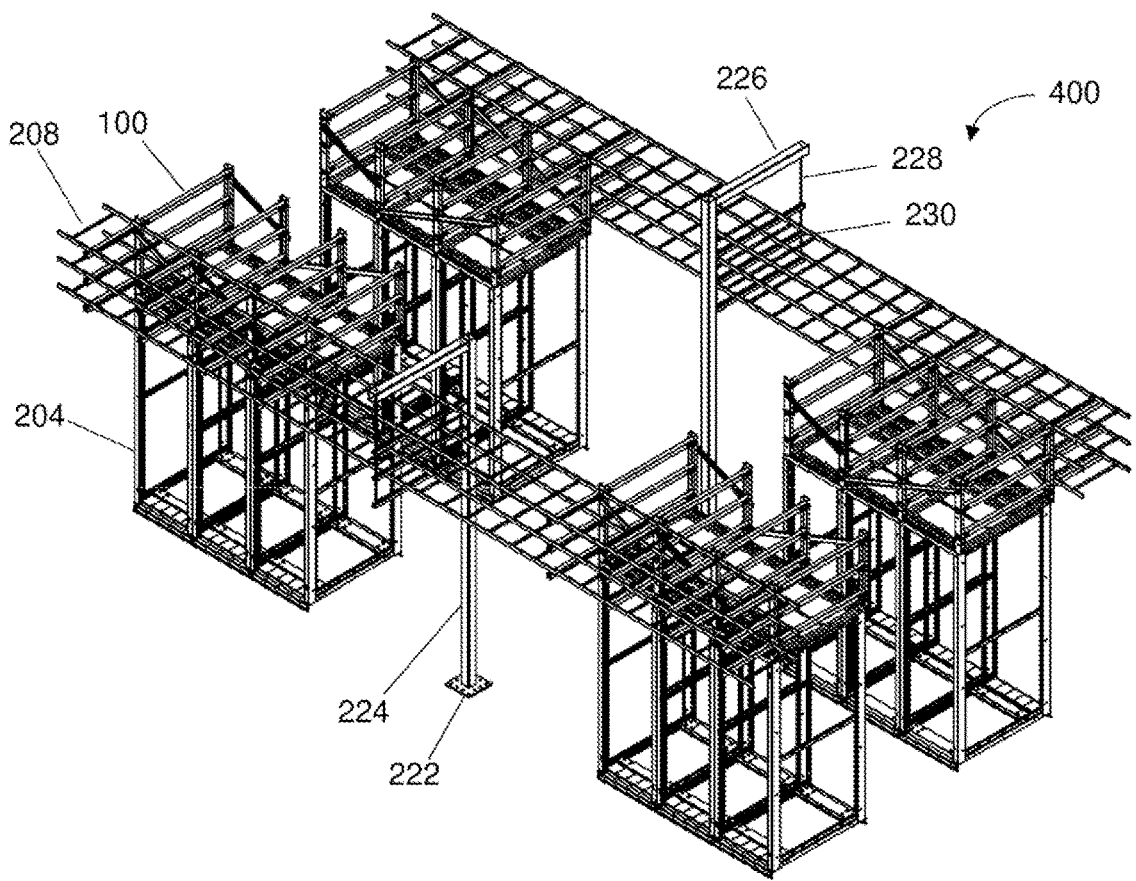
FIG. 45 is a perspective view of the exemplary overhead rack support installation of FIG. 40 coupled to top surfaces of cabinets positioned on opposing sides of aisles, including support posts for cable supports extending over the aisles.
Figure 46:
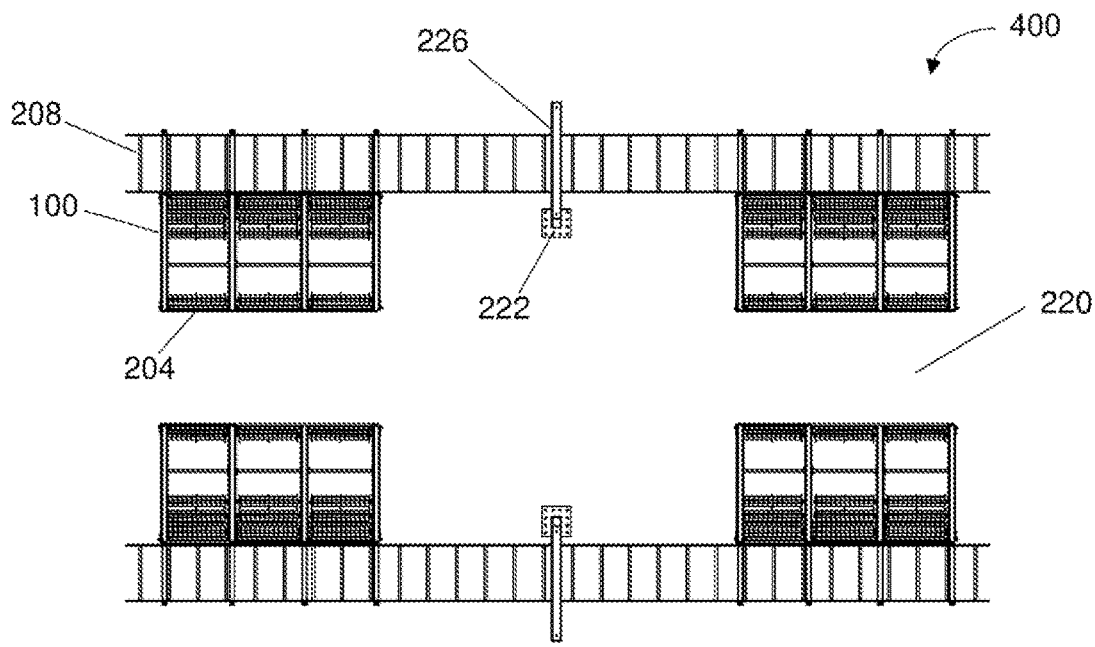
FIG. 46 is a top view of the exemplary overhead rack support installation of FIG. 45.

As an example, the assembly 350 essentially includes two supports 100 that share a central assembly 102. The braces 104 on one side of the assembly 350 are all installed in the same diagonal orientation, and the braces 106 on the opposing side of the assembly 350 are all installed in the opposing diagonal orientation. This assists with maintaining the seismic rating of the assembly 350 and provides structural stability to the assembly 350. The crisscross orientation of the braces 104, 106 can provide optimal rigidity with the least amount of components, ensuring a stronger overall assembly. In some embodiments, the braces 104, 106 could be installed in the same direction or the support 100 can include a crisscross of two braces 104, 106 at each sides of the assembly 350. FIGS. 38 and 39 are perspective and top views of the assembly 350 mounted to the top of the cabinets 204 while maintaining the aisle 220 free of obstructions.

FIGS. 40-46 show various views of multiple supports 100 coupled together to form an assembly 400, which can in turn be coupled to the top surface of cabinets 204. The assembly 400 can include a full sized support 100 connected to a single additional assembly 102. A partial length brace 206 can be used to connect the additional assembly 102 to the support 100, with the brace 206 extending at a different angle than the braces 104, 106. The number of assemblies 102 can thereby be customized to meet the size and support requirements of the user.

Figure 32:
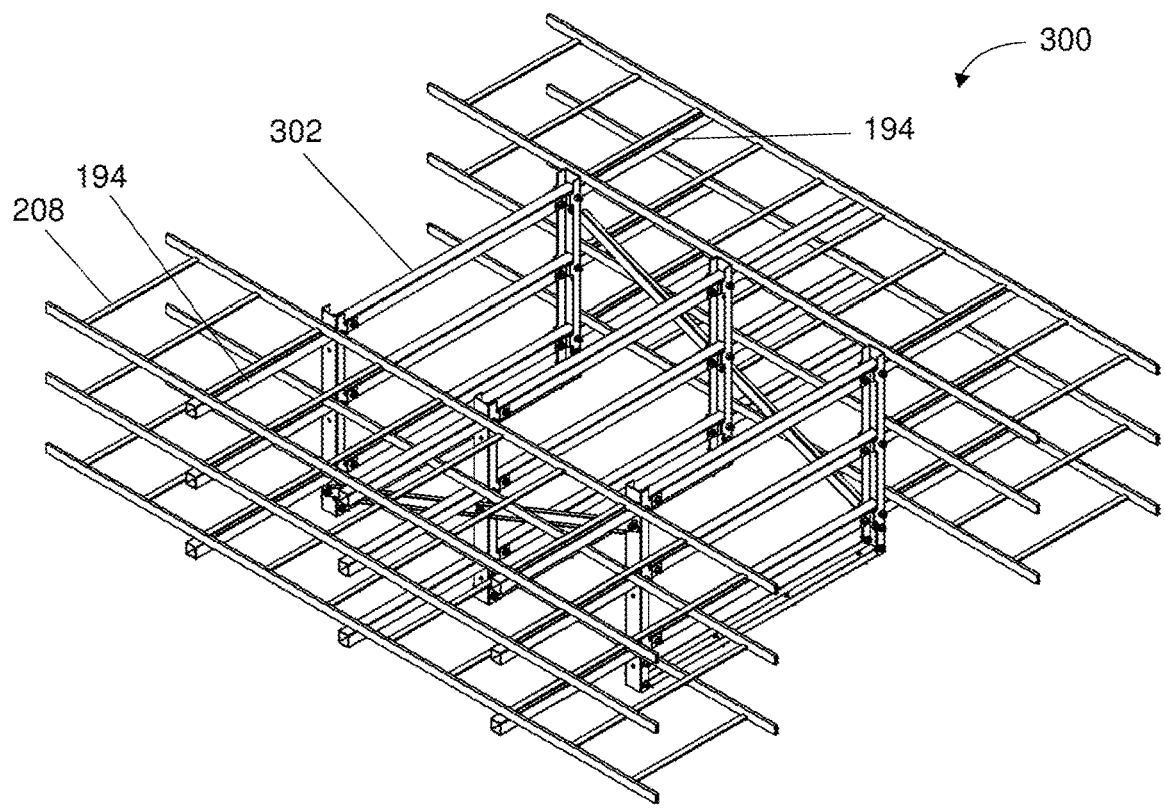
FIG. 32 is a perspective view of an exemplary overhead rack support in accordance with embodiments of the present disclosure, including cantilever extensions on opposing sides.
Figure 33:
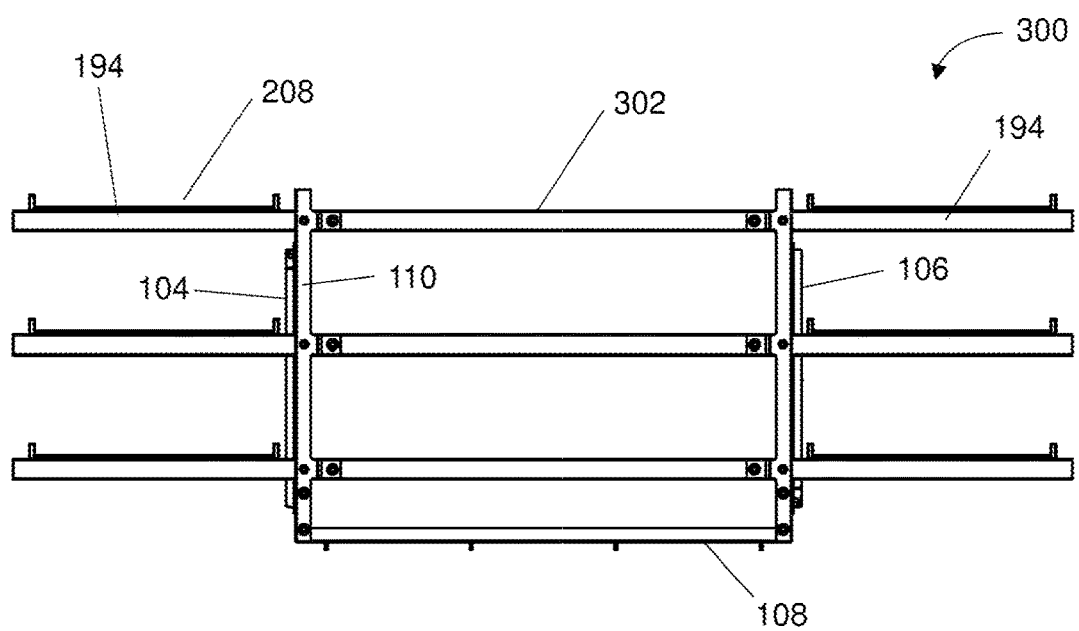
FIG. 33 is a side view of an exemplary overhead rack support of FIG. 32.
Figure 34:
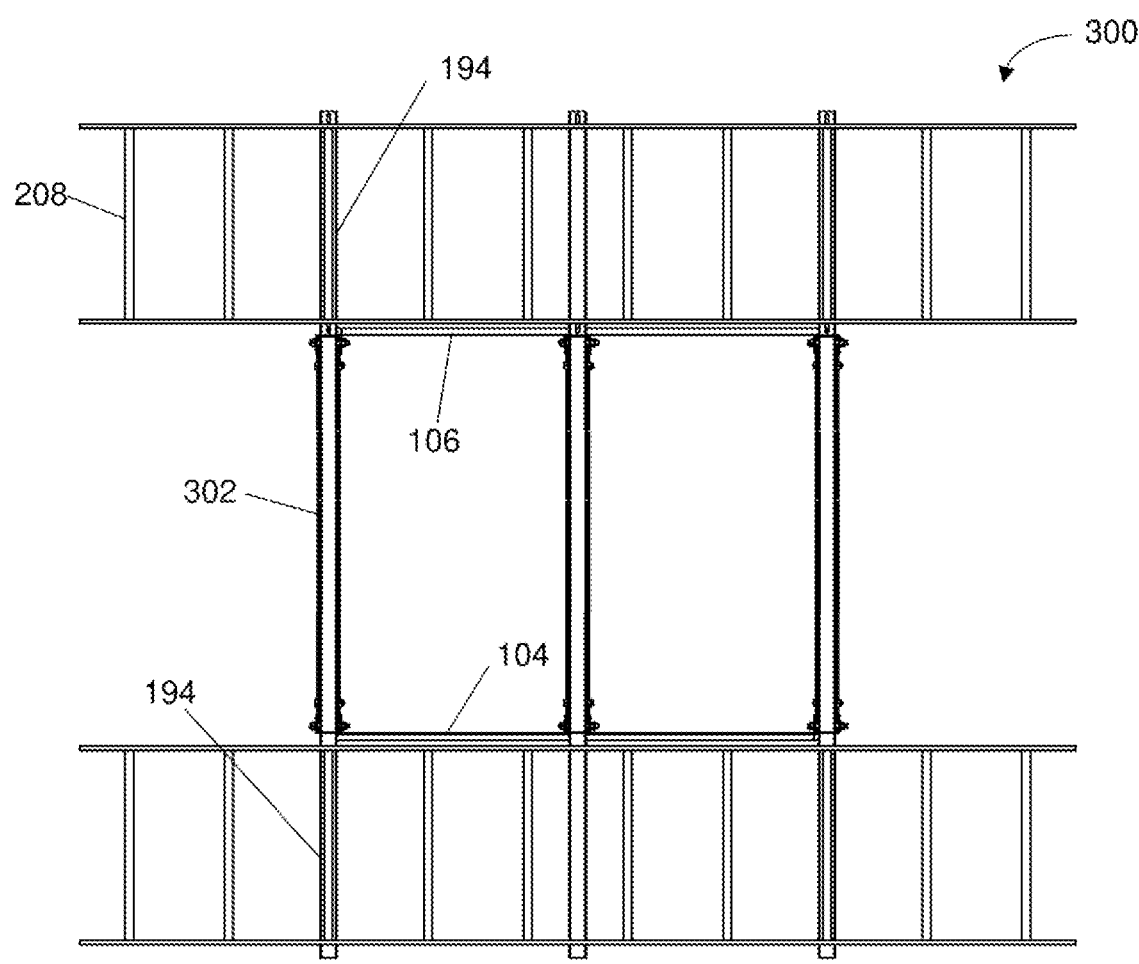
FIG. 34 is a top view of an exemplary overhead rack support of FIG. 32.
Figure 35:
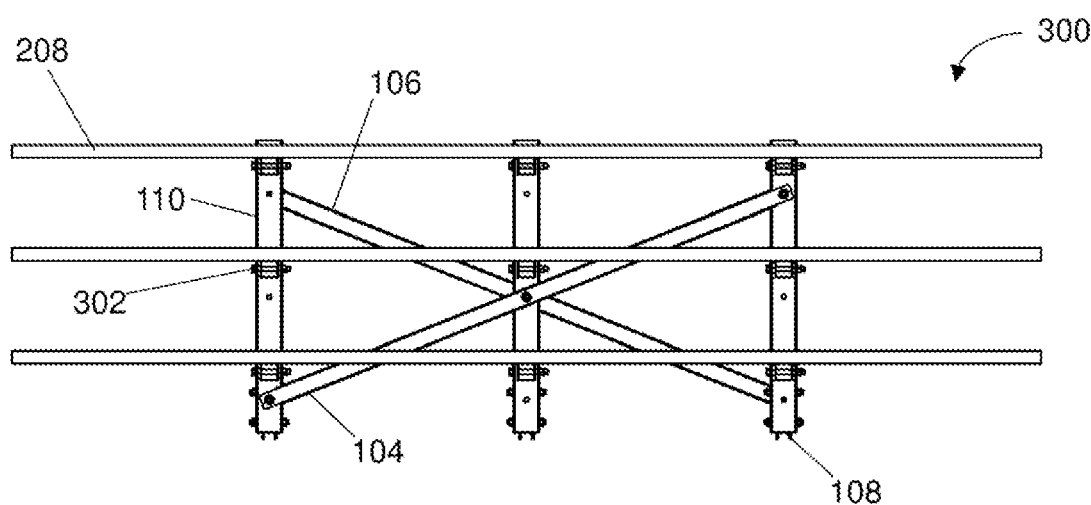
FIG. 35 is a front view of an exemplary overhead rack support of FIG. 32.
Figure 47:
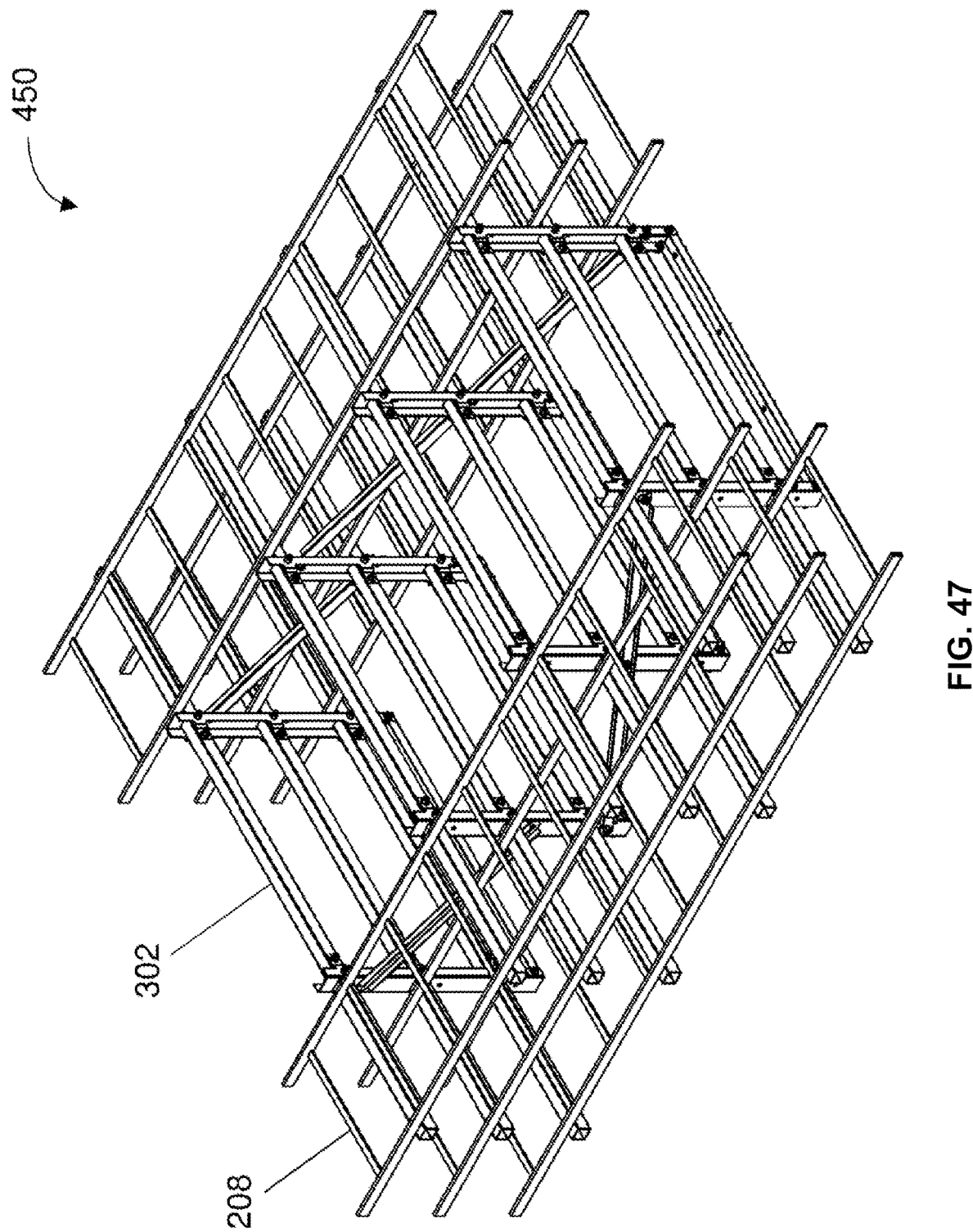
FIG. 47 is a perspective view of an exemplary overhead rack support of FIG. 32 assembled with a partial overhead rack support.

FIG. 47 is a perspective view of an exemplary overhead rack support 450 (hereinafter "support 450") that is a combination of the assembly 400 of FIGS. 40-46 and the components of the support 300 of FIG. 32. In particular, the support 450 can include full or partial supports 100 assembled together, and includes horizontal components 302 with cantilevered sections on both sides to allow for cable supports 208 to be used on both sides of the support 450. The supports discussed herein therefore provide for convenient and customizable structures that can be used to support different types of cables in a data center setting without interfering with aisles and without necessitating support from the ceiling of the data center.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. An overhead rack support, comprising:
   a first support assembly and a second support assembly, each of the first and second support assemblies including:
      a base component defining a bottom surface of the first and second support assemblies, the base component including opposing first and second ends;
      a first vertical component coupled to the first end of the base component, and a second vertical component coupled to the second end of the base component, wherein each of the first and second vertical components includes at least one opening formed therein; and
      at least one horizontal component extending through the at least one opening of the first and second vertical components and coupled to the first and second vertical components;
   a first brace member coupled to the first vertical component of the first and second support assemblies; and
   a second brace member coupled to the second vertical components of the first and second support assemblies.

2. The overhead rack support of claim 1, wherein the first and second support assemblies are oriented parallel to each other and are spaced from each other.

3. The overhead rack support of claim 1, comprising a third support assembly including the base component, the first vertical component, the second vertical component, and the at least one horizontal component.

4. The overhead rack support of claim 3, wherein:
   the first brace member is coupled to the first vertical component of the first support assembly near a top edge of the first vertical component of the first support assembly;
   the first brace member is coupled to the first vertical component of the second support assembly near a center of the first vertical component of the second support assembly; and
   the first brace member is coupled to the first vertical component of the third support assembly near a bottom edge of the first vertical component of the third support assembly.

5. The overhead rack support of claim 1, wherein the first and second braces are oriented in opposing directions relative to each other.

6. The overhead rack support of claim 1, wherein the base component includes a central wall, and flanges extending perpendicularly on opposing sides of the central wall.

7. The overhead rack support of claim 6, wherein the base component includes extensions protruding from the flanges at each corner of the base component, wherein the flanges are aligned with the flanges and extend perpendicularly relative to the central wall.

8. The overhead rack support of claim 7, wherein the base component defines a U-shaped configuration from both a front view and a side view.

9. The overhead rack support of claim 1, wherein the first vertical component is structurally equivalent to the second vertical component.

10. The overhead rack support of claim 1, wherein each of the first and second vertical components include a central wall with the at least one opening formed therein, and flanges extending perpendicularly from opposing sides of the central wall.

11. The overhead rack support of claim 10, wherein the first and second vertical components include mounting brackets extending from each of the flanges and aligned with the at least one opening.

12. The overhead rack support of claim 11, wherein the mounting bracket includes a first section extending in-line with the flanges, a second section extending from the first section and tapering inwardly over the central wall, and a third section extending from the second section parallel to the first section and laterally offset relative to the first section.

13. The overhead rack support of claim 12, wherein the second section tapers inwardly to define a width between the third section of the mounting brackets complementary to a width of the at least one horizontal component.

14. The overhead rack support of claim 1, wherein a bottom edge of the at least one opening of the first and second vertical components abuts a bottom wall of the at least one horizontal component to physically support the at least one horizontal component.

15. The overhead rack support of claim 1, wherein the at least one horizontal component includes a section extending from the first vertical component to the second vertical component, and includes at least one cantilevered section extending beyond a plane defined by at least one of the first vertical component or the second vertical component.

16. The overhead rack support of claim 15, wherein the at least one horizontal component includes openings formed in the at least one cantilevered section.

17. The overhead rack support of claim 16, comprising a removable cable support coupled to the at least one horizontal component at the openings formed in the at least one cantilevered section.

18. A cabinet system, comprising:
    at least one cabinet; and
    an overhead rack support mounted to a top surface of the at least one cabinet, wherein the overhead rack support includes:
        a first support assembly and a second support assembly, each of the first and second support assemblies including:
            a base component defining a bottom surface of the first and second support assemblies, the base component including opposing first and second ends;
            a first vertical component coupled to the first end of the base component, and a second vertical component coupled to the second end of the base component, wherein each of the first and second vertical components includes at least one opening formed therein; and
            at least one horizontal component extending through the at least one opening of the first and second vertical components and coupled to the first and second vertical components;
        a first brace member coupled to the first vertical component of the first and second support assemblies; and
        a second brace member coupled to the second vertical components of the first and second support assemblies.

19. The cabinet system of claim 1, comprising a cable support mounted to the at least one horizontal component of the overhead rack support, and comprising a support system mounted to and extending from a floor, the support system extending over the cable support to engage with the cable support and maintain a position of the cable support.

20. A method of cable support, the method comprising:
    mounting an overhead rack support to a top surface of a cabinet, the overhead rack support including:
        a first support assembly and a second support assembly, each of the first and second support assemblies including:
            a base component defining a bottom surface of the first and second support assemblies, the base component including opposing first and second ends;
            a first vertical component coupled to the first end of the base component, and a second vertical component coupled to the second end of the base component, wherein each of the first and second vertical components includes at least one opening formed therein; and
            at least one horizontal component extending through the at least one opening of the first and second vertical components and coupled to the first and second vertical components;
        a first brace member coupled to the first vertical component of the first and second support assemblies; and
        a second brace member coupled to the second vertical components of the first and second support assemblies; and
    routing cables from the cabinet to the at least one horizontal component to support the cables with the at least one horizontal component.

* * * * *